US012572236B2

(12) United States Patent
Burkovskyy et al.

(10) Patent No.: US 12,572,236 B2
(45) Date of Patent: Mar. 10, 2026

(54) METHODS AND SYSTEMS FOR CONTROLLING WAVEFORMS FOR REDUCING ELECTROMAGNETIC INTERFERENCE HARMONICS

(71) Applicant: PARADE TECHNOLOGIES, LTD., San Jose, CA (US)

(72) Inventors: Volodymyr Burkovskyy, Cork (IE); Denis Ellis, Cork (IE); Oleksandr Tymchuk, Cork (IE); Maksym Prybytko, Cork (IE)

(73) Assignee: PARADE TECHNOLOGIES, LTD., San Jose, CA (US)

( * ) Notice: Subject to any disclaimer, the term of this patent is extended or adjusted under 35 U.S.C. 154(b) by 0 days.

(21) Appl. No.: 18/619,031

(22) Filed: Mar. 27, 2024

(65) Prior Publication Data

US 2025/0306703 A1 Oct. 2, 2025

(51) Int. Cl.
*G06F 3/041* (2006.01)
*G06F 3/044* (2006.01)

(52) U.S. Cl.
CPC ........ *G06F 3/04166* (2019.05); *G06F 3/0418* (2013.01); *G06F 3/0446* (2019.05)

(58) Field of Classification Search
CPC ... G06F 3/04166; G06F 3/0418; G06F 3/0446
See application file for complete search history.

(56) References Cited

U.S. PATENT DOCUMENTS

| | | | |
|---|---|---|---|
| 11,231,768 B1 * | 1/2022 | Cheng ................... | G06F 1/3262 |
| 2014/0198053 A1 * | 7/2014 | Yoon ....................... | G06F 3/047 |
| | | | 345/173 |
| 2015/0035794 A1 * | 2/2015 | Zhitomirskiy ...... | G06F 3/04166 |
| | | | 345/174 |
| 2016/0357327 A1 * | 12/2016 | Chang ................... | G06F 3/0446 |
| 2019/0095006 A1 * | 3/2019 | Shahparnia ......... | G06F 3/04162 |
| 2019/0138148 A1 * | 5/2019 | Kwon ................... | G06F 3/0416 |
| 2022/0326831 A1 * | 10/2022 | Lee ....................... | G06F 3/04166 |
| 2023/0297190 A1 * | 9/2023 | Gao ....................... | G09G 3/3208 |

* cited by examiner

*Primary Examiner* — Md Saiful A Siddiqui
(74) *Attorney, Agent, or Firm* — Morgan, Lewis & Bockius LLP

(57) ABSTRACT

This application is directed to sensing touch events on a touch sensing panel including a capacitive sensor array. The capacitive sensor array includes a plurality of touch sensing regions and is coupled to a processing device. The processing device identifies, and generates drive signals for, the touch sensing regions of the touch sensing panel. Each drive signal corresponds to a distinct touch sensing region and includes a respective train of periodic pulses. For each drive signal, the respective train of periodic pulses has a respective phase offset with respect to a reference (e.g., a train of periodic pulses of one of the plurality of drive signals, a fixed reference time). While applying the drive signals on the touch sensing regions, the processing device measures capacitance sensing signals from the touch sensing regions. Touch events are detected on the capacitive sensor array based on the capacitance sensing signals.

20 Claims, 14 Drawing Sheets

200

210
208
204
202

Top Glass

OCA (Optically Clear Adhesive)

206

LED Drive Electrodes driven by a TFT array

LCD

128

Common Electrode(s)

212

250

Gate 218
On: 13V
Off: -10V

TFT 216

Display
Electrode 214

Source 220

[-5,0]V
[0,5]V

Cs

Display
Pixel
250

Common
Electrode
128

0V or ±2V

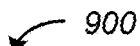

_900_

902 Identify a plurality of touch sensing regions of the touch sensing panel.

904 The touch sensing panel includes a capacitive sensor array.

906 Generate a plurality of drive signals for the plurality of touch sensing regions.

908 Each drive signal corresponds to a distinct one of the plurality of touch sensing regions and includes a respective train of periodic pulses.

910 For each drive signal, the respective train of periodic pulses has a respective phase offset with respect to a reference (e.g., a train of periodic pulses of one of the drive signals, a reference time).

912 While applying the plurality of drive signals on the plurality of touch sensing regions, measure a plurality of capacitance sensing signals from the plurality of touch sensing regions.

914 Detect one or more touch events on the capacitive sensor array based on the plurality of capacitance sensing signals.

Figure 9

METHODS AND SYSTEMS FOR CONTROLLING WAVEFORMS FOR REDUCING ELECTROMAGNETIC INTERFERENCE HARMONICS

TECHNICAL FIELD

This application relates generally to touch sensing technology, including but not limited to, methods and systems for controlling waveforms of drive signals of a touch sensing array and reducing electromagnetic interference harmonic amplitudes.

BACKGROUND

Touch screens that utilize capacitive sense arrays are widely applied in today's industrial and consumer product markets. Capacitive sense arrays can be found in cellular phones, GPS devices, set-top boxes, cameras, computer screens, MP3 players, digital tablets, and the like, replacing mechanical buttons, knobs, and other conventional user interface controls. A capacitive sense array is often disposed below a touch sensing surface of a touch screen, and includes an array of capacitive sense elements. Capacitances of these capacitive sense elements vary when an object (e.g., a finger, a hand, a stylus, or another object) comes into contact with or hovers above the touch sensing surface. A processing device coupled to the capacitive sense array then measures the capacitances of the capacitive sense elements and/or identifies capacitance variations of the capacitive sense elements for determining a touch or presence of the object associated with the touch sensing surface. The use of the capacitive sense array has offered a convenient and reliable user interface solution that is feasible under many harsh conditions. A challenge in measuring capacitance variations is to reduce electromagnetic interference (EMI) among different capacitive sense elements and satisfy specific radio disturbance limits.

SUMMARY

Some implementations of this application are directed to reducing electromagnetic interference (EMI) harmonic amplitudes by applying phase shifts to drive signals of every scan of a capacitive sensing array of a touch sensing panel (e.g., a touch display). For instance, when different regions of a touch sensing panel are driven by a plurality of drive signals including a first drive signal, each of a remainder of the plurality of drive signals has a phase offset relative to a first drive signal. Phase offsets among the plurality of drive signals create new harmonics that resemble original harmonics (e.g., main harmonics) without phase shifts. The new harmonics take a portion of energy of the original harmonics and have smaller amplitudes. In some implementations, International Special Committee on Radio Interference (CISPR) sets standards for controlling electromagnetic interference in electrical and electronic devices. The touch sensing panel is configured to control its EMI level to specific radio disturbance limits (e.g., those outlined in CISPR-25 specifications)

Some implementations of this application are directed to reducing EMI harmonic amplitudes by applying flat-peak sinusoidal waveforms to drive a touch sensing panel. Rising and/or falling edges of a flat-peak sinusoidal waveform match those of a corresponding sinusoidal waveform. For example, the sinusoidal waveform is used at the rising edge of the flat-peak sinusoidal waveform for a transition, which is subsequently held at its peak value (also called positive peak value) for a duration (e.g., 25% of the period) before reaching a peak of the sinusoidal waveform to allow for panel settling. In some implementations, the sinusoidal waveform is used for the transition at on falling edge of the flat-peak sinusoidal waveform, which is subsequently held at its valley value (also called negative peak value) for a duration (e.g., 25% of the period). The flat-peak sinusoidal waveforms control panel charging speeds of capacitive sensors, thereby helping reduce EMI harmonic amplitudes of a touch sensing panel.

In accordance with one aspect of the application, a method of sensing touch events on a touch sensing panel includes identifying a plurality of touch sensing regions of the touch sensing panel, the touch sensing panel including a capacitive sensor array. The method further includes generating a plurality of drive signals for the plurality of touch sensing regions, each drive signal corresponding to a distinct one of the plurality of touch sensing regions and including a respective train of periodic pulses. For each drive signal, the respective train of periodic pulses has a respective phase offset with respect to a reference (e.g., a train of periodic pulses of one of the plurality of drive signals, a fixed reference time). The method further includes while applying the plurality of drive signals on the plurality of touch sensing regions, measuring a plurality of capacitance sensing signals from the plurality of touch sensing regions. The method further includes detecting one or more touch events on the capacitive sensor array based on the plurality of capacitance sensing signals.

In some implementations, for each drive signal, the respective train of periodic pulses includes a flat-peak sinusoidal waveform in each periodic cycle. The flat-peak sinusoidal waveform further includes at least one peak portion and two edge portions. The at least one peak portion includes at least one of a first peak portion and a second peak portion. The first peak portion is saturated at a predefined high voltage level and the second peak portion is saturated at a predefined low voltage level. The two edge portions match a full sinusoidal waveform corresponding to the flat-peak sinusoidal waveform. The two edge portions include a rising edge portion and a falling edge portion.

In yet another aspect of the application, an electronic device includes a touch sensing panel and a processing device. The touch sensing panel includes a capacitive sensor array and partitioned to a plurality of touch sensing regions. The processing device is coupled to the capacitive sensor array. The processing device further includes a processing core, a memory coupled to the processing core, and a capacitive sense circuit coupled to the processing core. The memory stores one or more programs configured for execution by the processing core to control the capacitive sense circuit to implement any of the methods described in the above implementations.

These illustrative aspects are mentioned not to limit or define the disclosure, but to provide examples to aid understanding thereof. Additional implementations are discussed in the Description of Implementations, and further description is provided there.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 9 is a flow diagram of an example method of sensing touch events on a touch sensing panel, in accordance with some implementations.

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Figure 1:
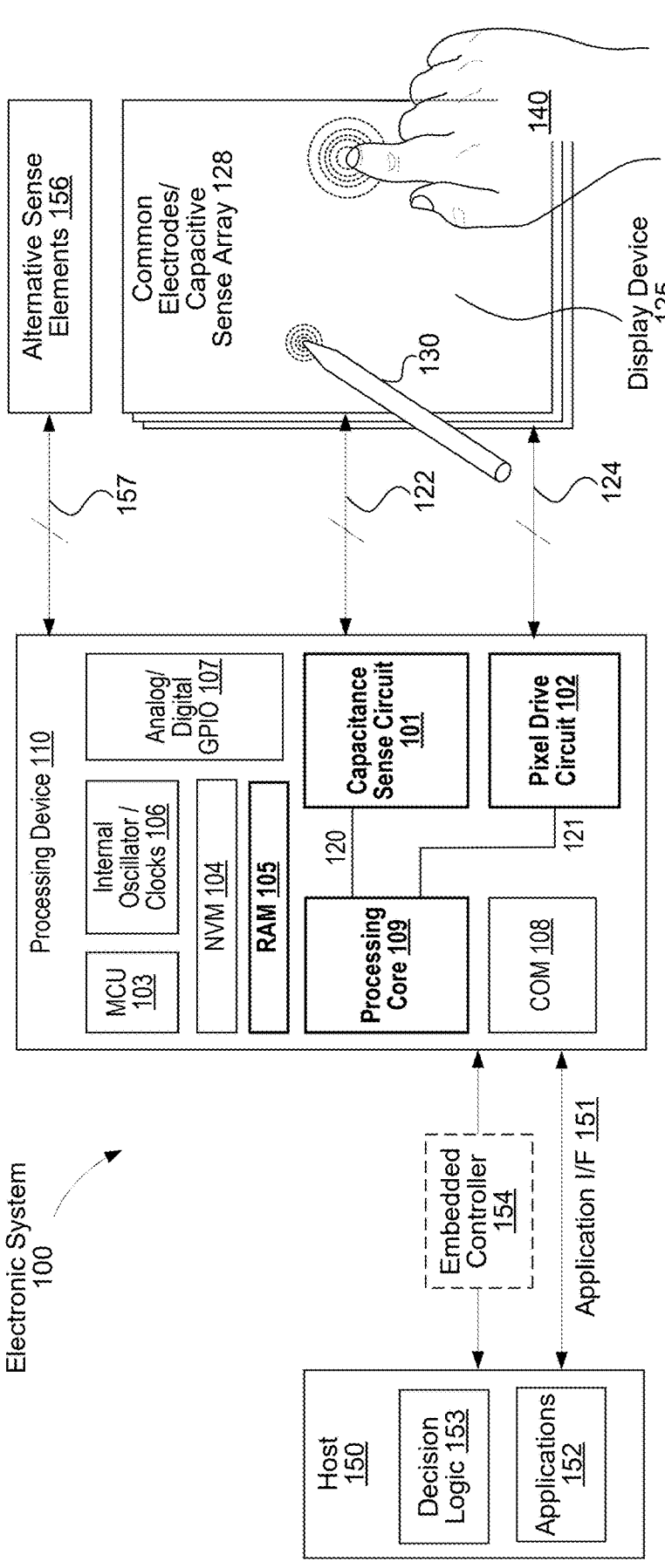
FIG. 1 is a block diagram illustrating an electronic system having a processing device that generates display driving signals and processes capacitive sense signals, in accordance with some implementations.

FIG. 1 is a block diagram illustrating an electronic system 100 having a processing device 110 that generates display driving signals and processes capacitive sense signals, in accordance with some implementations. The processing device 110 is electrically coupled to a display device 125 including a display pixel array. The display pixel array further includes a plurality of display pixels, a plurality of display electrodes and a plurality of common electrodes 128. Each display pixel is disposed between a display electrode and a common electrode 128. More details of the display device 125 are explained below with reference to FIGS.

2A-2B and 3A-3B. The processing device 110 operates in two states including a display driving state and a touch sensing state. In the display driving state, a voltage bias is generated and applied between the display and common electrodes of each display pixel to enable display of a color on the respective display pixel. In the touch sensing state, the plurality of common electrodes 128 are reconfigured to operate as a capacitive sense array 128, and the processing device 110 is configured to measure capacitance variations at the plurality of common electrodes 128 and detect one or more touches proximate to a surface of the display device 125. In some implementations, the processing device 110 alternates between the display driving state and the touch sensing state according to a predetermined duty cycle (e.g., 80%) for the display driving state, and detects a contact with or a proximity to a touch sensing surface associated with the display pixel array without interfering with current display operations of the display pixel array. In some implementations, the capacitive sense array 128 forms a touch sensing panel.

The processing device 110 can detect conductive objects, such as touch objects 140 (e.g., a finger), a passive or active stylus 130, or any combination thereof when operating in the touch sensing state. The capacitance sense circuit 101 can measure touch data created by a touch using the capacitive sense array 128 reconfigured from the plurality of common electrodes 128. The touch may be detected by a single or a plurality of sensing cells, each cell representing an isolated sense element or an intersection of sense elements (e.g., electrodes) of the reconfigured capacitive sense array 128. In some implementations, when the capacitance sense circuit 101 measures mutual capacitance of the reconfigured capacitive sense array 128, the processing device 110 acquires a two dimensional capacitive image of the touch sensing object and processes the capacitive image data for peaks and positional information. In some implementations, the processing device 110 is coupled to a microcontroller (e.g., an external host device 150) that obtains a capacitance touch signal data set from the reconfigured capacitive sense array 128. In some implementations, finger detection firmware executing on the microcontroller identifies data set areas that indicate touches, detects and processes peaks, calculates the coordinates, or any combination thereof. The microcontroller can report the precise coordinates and other information on an application processor.

In some implementations, the electronic system 100 includes one or more of a processing device 110, a display device 125 (including a display pixel array), a stylus 130, and a host 150. The common electrodes 128 may include electrodes made of conductive material, such as copper, and are reconfigured to capacitive sense array 128 including capacitive sense elements that are electrodes made of the same conductive material. The common electrodes and sense elements may also be part of an indium-tin-oxide (ITO) panel. In the display driving state, the common electrodes 128 provide a bias voltage or a reference voltage to each display pixel of the display pixel array, thereby enabling display of a color on the respective display pixel. In the depicted implementation, the electronic system 100 includes the common electrodes 128 coupled to the processing device 110 via a bus 124, and the common electrodes 128 are configured to receive display driving signals from the processing device 110 via the bus 124. More specifically, the display driving signals are generated by a pixel drive circuit 102 of the processing device 110. Alternatively, in the touch sensing state, the capacitive sense elements of the reconfigured capacitive sense array 128 can be used to allow the capacitance sense circuit 101 to measure self-capacitance, mutual capacitance, or any combination thereof. In the depicted implementation, the electronic system 100 includes the reconfigured capacitive sense array 128 coupled to the processing device 110 via a bus 122, and the reconfigured capacitive sense array 128 is configured to provide capacitive sense signals to a capacitance sense circuit 101 of the processing device 110 via the bus 122. The reconfigured capacitive sense array 128 may include a multi-dimension capacitive sense array. In some implementations, the multi-dimension sense array includes a plurality of sense elements, organized as rows and columns. In some implementations, the reconfigured capacitive sense array 128 has a flat surface profile. In some implementations, the capacitive sense array 128 may have a non-flat surface profile. In some implementations, other configurations of capacitive sense arrays can be used. For example, instead of vertical columns and horizontal rows, the capacitive sense array 128 may have a hexagonal arrangement, or the like, as would be appreciated by one of ordinary skill in the art having the benefit of this disclosure. More details on a capacitive sense array 128 are explained below with reference to FIGS. 2A-2B and 3A-3B.

In some implementations, the electronic system 100 further includes one or more force electrodes (not shown in FIG. 1) that are disposed below the reconfigured capacitive sense array 128 and separated from the reconfigured capacitive sense array 128. The one or more force electrodes are electrically coupled to the processing device 110, and are configured to provide force signals to the processing device 110 for determining force associated with candidate touches detected from the reconfigured capacitive sense array 128. In some implementations, the force signals are measured from capacitance variation associated with the one or more force electrodes, and used to improve accuracy of touch detection based on the capacitive sensing signals.

The operations and configurations of the processing device 110 and the reconfigured capacitive sense array 128 for detecting and tracking a touch object 140 or a stylus 130 are described herein. In short, the processing device 110 is configurable to detect a presence of a touch object 140, a presence of a stylus 130 on the reconfigured capacitive sense array 128, or any combination thereof. If the touching object is an active stylus, the active stylus 130 is configured to operate as the timing "master," and the processing device 110 adjusts the timing of the reconfigured capacitive sense array 128 to match that of the active stylus 130. In some implementations, the reconfigured capacitive sense array 128 capacitively couples with the active stylus 130, as opposed to conventional inductive stylus applications. It should also be noted that the same assembly (e.g., the processing device 110) used for the reconfigured capacitive sense array 128, which is configured to detect touch objects 140, is also used to detect and track the stylus 130 without an additional PCB layer for inductively tracking the active stylus 130.

In some implementations, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). In some implementations, the digital block array is configured to implement a variety of digital logic circuits (e.g., DACs, digital filters, or digital control systems) using configurable user modules ("UMs"). The digital block array may be coupled to a system bus. The processing device 110 may also include memory, such as random access memory ("RAM") 105 and non-volatile memory ("NVM") 104. RAM 105 may be static RAM ("SRAM"). The non-volatile memory 104 may be a flash memory, which may be used to store firmware (e.g., control algorithms executable by processing core 109 to implement operations described herein). The processing device 110 may also include a memory controller unit ("MCU") 103 coupled to memory and the processing core 109. The processing core 109 is a processing element configured to execute instructions or perform operations. The processing device 110 may include other processing elements as would be appreciated by one of ordinary skill in the art having the benefit of this disclosure. It should also be noted that the memory may be internal to the processing device 110 or external to it. In the case of the memory being internal, the memory may be coupled to a processing element, such as the processing core 109. In the case of the memory being external to the processing device 110, the processing device 110 is coupled to the other device in which the memory resides as would be appreciated by one of ordinary skill in the art having the benefit of this disclosure.

Some or all of the operations of the processing core 109 may be implemented in firmware, hardware, software, or some combination thereof. The processing core 109 may receive signals from the capacitance sense circuit 101, determine the state of the reconfigured capacitive sense array 128 (e.g., determining whether an object is detected on or in proximity to the touch sensing surface), resolve where the object is on the sense array (e.g., determining the location of the object), track the motion of the object, or generate other information related to an object detected at the touch sensor. In some implementations, the processing core 109 includes the capacitance sense circuit 101. In some implementations, the processing core 109 performs some or all the functions of capacitance sense circuit 101. Additionally, in some implementations, the processing core 109 provides display information to the pixel drive circuit 102, such that the pixel drive circuit 102 can be configured to drive individual display pixels in the display device 125 to display images or videos based on the display information. In some implementations, the processing core 109 includes some or all functions of the pixel drive circuit 102, i.e., part or all of the pixel drive circuit 102 is integrated in the processing core 109.

In some implementations, the processing core 109 generates a touch detection enable signal 120 and a display driving enable signal 121 that are synchronized to control the capacitance sensing circuit 101 and the pixel drive circuit 102 to detect touch locations and drive individual display pixels, respectively. The touch detection enable signal 120 is used to enable a touch sensing state. In the touch sensing state, the common electrodes 128 are decoupled from the pixel drive circuit 102 and reconfigured to the capacitive sense array 128 coupled to the capacitance sense circuit 102. Self or mutual capacitance of sense elements of the reconfigured capacitive sense array 128 is scanned by the capacitance sense circuit 102. One or more touch locations are thereby detected if one or more objects touch the touch sensing surface of the electronic system 100. Alternatively, in some implementations, the display driving enable signal 121 is used to enable a display driving state (e.g., decouple the capacitance sense circuit 101 from the reconfigured capacitive sense array 128 and couple the pixel drive circuit 102 to the common electrodes 128). In such a display driving state, the pixel drive circuit 102 enables a bias voltage and a reference voltage corresponding to an intended color on each display pixel of the display pixel array. The display pixel displays the intended color when the bias voltage and the reference voltage are applied on the display and common electrodes of the respective display pixel. It is noted that the touch detection enable signal 120 and the display driving enable signal 121 can be enabled sequentially and share operation time of the common electrodes/capacitive sense array 128.

The processing device 110 may also include an analog block array (not shown) (e.g., field-programmable analog array). The analog block array is also coupled to the system bus. An analog block array may be configured to implement a variety of analog circuits (e.g., ADCs or analog filters) using, in some implementations, configurable UMs. The analog block array may also be coupled to the GPIO 107.

In some implementations, the capacitance sense circuit 101 is integrated into the processing device 110. The capacitance sense circuit 101 includes analog I/O for coupling to an external component, such as a touch-sensor pad (not shown), a reconfigured capacitive sense array 128, a touch-sensor slider (not shown), a touch-sensor buttons (not shown), and/or other devices. The capacitance sense circuit 101 may be configured to measure capacitance using mutual-capacitance sensing techniques, self-capacitance sensing technique, charge-coupling techniques, charge balancing techniques, or the like. In some implementations, the capacitance sense circuit 101 operates using a charge accumulation circuit, a capacitance modulation circuit, or other capacitance sensing methods known by those skilled in the art. In some implementations, other capacitance sensing circuits may be used. The mutual capacitive sense arrays, or touch screens, as described herein, may include a transparent, conductive sense array disposed on, in, or under either a visual display itself (e.g. LCD monitor), or a transparent substrate in front of the display.

A reconfigured capacitive sense array 128 includes a plurality of sense elements. When a touch object, such as a finger 140 or stylus 130, approaches the reconfigured capacitive sense array 128, the object causes a decrease in mutual capacitance between some of the sense elements. In some implementations, the presence of a finger increases the capacitance of the electrodes to the environment (Earth) ground, typically referred to as self-capacitance change. In some implementations, the plurality of sense elements of the reconfigured capacitive sense array 128 are configured to operate as transmit (TX) electrodes and receive (RX) electrodes of a mutual capacitive sense array in a first mode to detect touch objects, and to operate as electrodes of a coupled-charge receiver in a second mode to detect a stylus on the same electrodes of the sense array. Specifically, in the first mode, a mutual capacitance is measured at an intersection of a RX electrode and a TX electrode when a transmit signal provided at the RX electrode is coupled to the TX electrode. Utilizing the change in mutual capacitance, the location of the finger on the reconfigured capacitive sense array 128 is determined by identifying an RX electrode having a decreased coupling capacitance with a TX electrode whose signal was applied at the time the decreased capacitance is measured on the RX electrode. Therefore, the locations of one or more touch objects can be determined by sequentially scanning the capacitances associated with the intersection of electrodes. In some implementations, in the second mode, the stylus 130 is activated to generate a stylus transmit signal, which is then coupled to a subset of sense elements of the reconfigured capacitive sense array 128 that is located below the stylus 130.

In some implementations, the processing device 110 calibrates the sense elements (intersections of RX and TX electrodes) by determining baselines for the sense elements. In some implementations, interpolation is used to detect finger position at better resolutions than a spatial pitch of the sense elements of the reconfigured capacitive sense array 128, and various types of coordinate interpolation algorithms are optionally used to detect a center location of a touch.

The processing device 110 may include internal oscillator/clocks 106 and a communication block ("COM") 108. In some implementations, the processing device 110 includes a spread-spectrum clock (not shown). The oscillator/clocks 106 provides clock signals to one or more of the components of processing device 110. The communication block 108 may be used to communicate with an external component, such as an application processor 152, via an application interface ("I/F") line 151. In some implementations, the processing device 110 may also be coupled to an embedded controller 154 to communicate with the external components, such as a host 150. In some implementations, the processing device 110 is configured to communicate with the embedded controller 154 or the host 150 to send and/or receive data.

The processing device 110 may reside on a common carrier substrate such as, for example, an integrated circuit ("IC") die substrate, a multi-chip module substrate, or the like. In some implementations, the components of the processing device 110 may be one or more separate integrated circuits and/or discrete components. In some implementations, the processing device 110 may be one or more other processing devices known by those of ordinary skill in the art, such as a microprocessor or central processing unit, a controller, a special-purpose processor, a digital signal processor ("DSP"), an application specific integrated circuit ("ASIC"), a field programmable gate array ("FPGA"), or the like.

It is also noted that the implementations described herein are not limited to having a configuration of a processing device coupled to an application processor, but may include a system that measures the capacitance on the capacitive sense array and sends the raw data to a host computer 150 where it is analyzed by an application. In effect, the processing that is done by the processing device 110 may also be done in the application processor. Specifically, in some implementations, instead of performing the operations of the processing core 109 in the processing device 110, the processing device 110 may send the raw data or partially-processed data to the host 150. The host 150, as illustrated in FIG. 1, may include decision logic 153 that performs some or all of the operations of the processing core 109. Operations of the decision logic 153 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing core 109 may be implemented in the decision logic 153, the applications 152, or in other hardware, software, and/or firmware external to the processing device 110. In some other implementations, the processing device 110 is the host 150.

The capacitance sense circuit 101 may be integrated into the IC of the processing device 110, or in a separate IC. In some implementations, descriptions of capacitance sense circuit 101 may be generated and compiled for incorporation into other integrated circuits. For example, behavioral level code describing the capacitance sense circuit 101, or portions thereof, may be generated using a hardware descriptive language, such as VHDL or Verilog, and stored to a machine-accessible medium (e.g., CD-ROM, hard disk, floppy disk, or flash memory). Furthermore, the behavioral level code can be compiled into register transfer level ("RTL") code, a netlist, or a circuit layout and stored to a machine-accessible medium. The behavioral level code, the RTL code, the netlist, and the circuit layout may represent various levels of abstraction to describe the capacitance sense circuit 101.

It is noted that the components of the electronic system 100 may include all the components described above. In some implementations, the electronic system 100 includes fewer than all of the components described above.

In some implementations, the electronic system 100 is used in a tablet computer. In some implementations, the electronic device is used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, a global position system ("GPS"), or a control panel. The implementations described herein are not limited to touch screens or touch-sensor pads for notebook implementations. Implementations can be used in other capacitive sensing devices, such as a touch-sensor slider (not shown) or touch-sensor buttons (e.g., capacitance sensing buttons). In some implementations, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these capacitive sensing implementations may be used in conjunction with non-capacitive sensing elements, including but not limited to pick buttons, sliders (e.g., display brightness and contrast), scroll-wheels, multi-media control (e.g., volume, track advance), handwriting recognition, and numeric keypad operation.

In some implementations, the electronic system 100 further includes one or more alternative sense elements 156 configured to communicate with the processing device 110 via a bus 157. Each alternative sense element 156 is optionally a capacitance based sensor or a non-capacitance sensor. Example alternative sense elements 156 include, but are not limited to, an ambient light sensor, a capacitive touch button, and a side touch sensor.

Figure 2A:
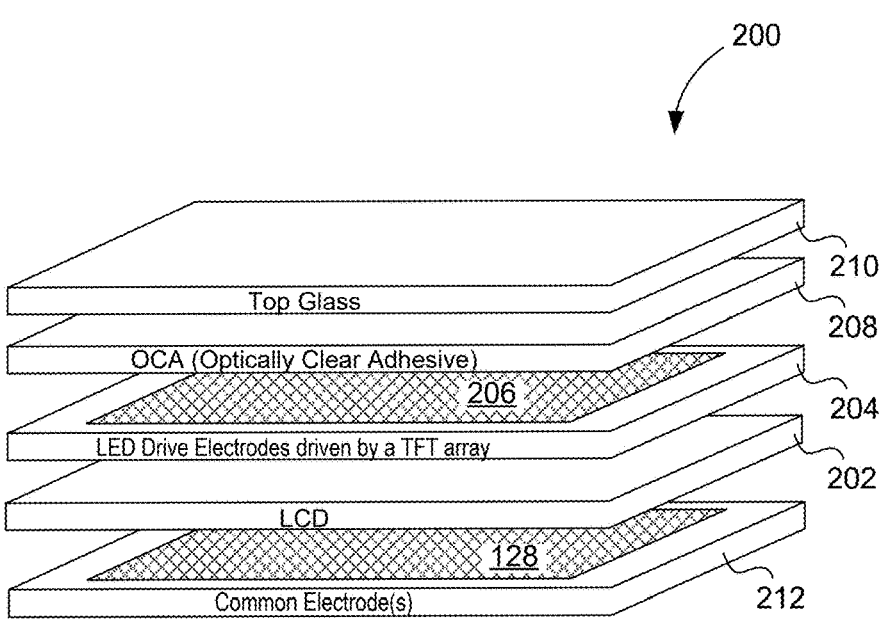
FIG. 2A illustrates an example touch screen assembly (e.g., a liquid crystal display screen) including a common electrode array that is reconfigured to a capacitive sense array, in accordance with some implementations.

FIG. 2A illustrates an example touch screen assembly 200 (e.g., a liquid crystal display screen) including a common electrode array that is reconfigured to a touch sensing panel including a capacitive sense array 128, in accordance with some implementations. The touch screen assembly 200 includes a liquid crystal display (LCD) 202 overlaid by the glass 204. A display pattern 206 is constructed on a surface of the glass 204 to form a footprint of a display pixel array. Optionally, as shown in FIG. 2A, the display pattern 206 is constructed on a top surface of the glass 204 that faces away from the LCD 202 or on a bottom surface of the glass 204 that faces the LCD 202. The display pattern 206 includes a plurality of display electrodes for driving a plurality of display pixels made of LCD molecules of the LCD 202. Optically clear adhesive (OCA) 208 is used to bond a top glass 210 to the surface of the glass 204 on which the display pattern 206 is constructed, thus protecting the display pattern 206. The touch screen assembly 200 further includes a common electrode array 128 opposing the plurality of display electrodes formed on display pattern 206. Stated another way, the common electrode array 128 is formed on a glass 212 disposed under the LCD 202 and oppose the glass 204. As such, each display pixel of the LCD 202 is disposed between a respective display electrode and a respective common electrode that are formed on the display pattern 206 and the common electrode layer 128, respectively.

In some implementations not shown in FIG. 2A, the display pattern 206 is constructed on a surface of the glass 204 to form a footprint of a display pixel array, and the glass 204 is disposed under the LCD 202. The common electrode array 128 is formed on the glass 212, and the glass 212 is disposed above the LCD 202 and oppose the glass 204. The top glass 210 is bonded to the glass 212 using OCA 208 for protecting the common electrode layer 128. Each display pixel of the LCD 202 is still disposed between a respective display electrode and a respective common electrode that are formed on the display pattern 206 and the common electrode layer 128, respectively.

Figure 2B:
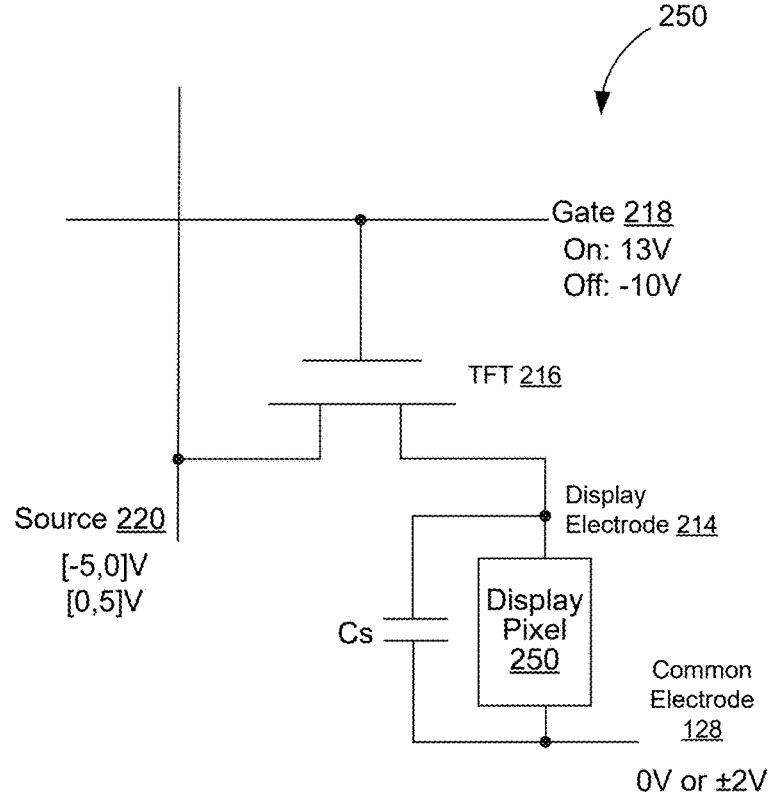
FIG. 2B illustrates an example display pixel driven by a display electrode and a common electrode in a display driving state, in accordance with some implementations.

In some implementations, a first thin film transistor (TFT) array is formed on the glass 204 to drive the display electrodes formed on the display pattern 206. More specifically, a gate layer, a semiconductor layer, a source/drain layer, one or more conductive layers and one or more intervening insulating layers are deposited on the glass 204. These material layers are lithographically patterned on the glass 204 to form functional part (e.g., gate, source and drain) of the TFTs as well as the row and column lines of the first TFT array. For each individual display pixel of the LCD 202, the respective display electrode is electrically coupled to a respective TFT of the first TFT array. The first TFT array is configured to receive display driving signals from the processing device 110 (more specifically, the pixel drive circuit 102 of the processing device 110), and generates a first electrical voltage or current to drive the display electrode of each display pixel. As the first electrical voltage or current is applied to the liquid crystal molecules corresponding to each display pixel, the molecules tend to untwist from its original twisted form, and cause a change in the angle of an incident light. Stated another way, the first TFT array includes a two dimensional (2D) array of TFTs, row lines and column lines. As shown in FIG. 2B, each TFT of the first TFT array is connected between a respective row line and a respective column line, and configured to provide the first electrical voltage or current to drive the corresponding liquid crystal molecules of the corresponding display pixel. In some implementations, the entire common electrode layer 128 is electrically coupled to a reference voltage (sometimes referred to as VCOM). In some implementations, the common electrodes 128 corresponding to the display pixels are driven individually or in group as explained below.

It is noted that in some implementations, a second thin film transistor (TFT) array is formed on the glass 212 to drive the common electrodes 128. More specifically, a gate layer, a semiconductor layer, a source/drain layer, one or more conductive layers and one or more intervening insulating layers are deposited on the glass 212. These material layers are lithographically patterned on the glass 212 to form functional part (e.g., gate, source and drain) of the second TFTs as well as the row and column lines of the second TFT array. For each individual display pixel of the LCD 202, the respective common electrode is electrically coupled to a respective TFT of the second TFT array. The TFT array is configured to receive display driving signals from the processing device 110, and generates a second electrical voltage or current to drive the common electrode corresponding to each display pixel. As the first and second electrical voltages/currents are applied to the liquid crystal molecules corresponding to each display pixel, the molecules tend to untwist from its original twisted form, and cause a change in the angle of an incident light. Stated another way, the second TFT array includes a two dimensional (2D) array of TFTs, row lines and column lines. Each TFT of the second TFT array is connected between a respective row line and a respective column line, and configured to provide the second electrical voltage or current to drive the corresponding liquid crystal molecules of the corresponding display pixel in conjunction with the first electrical voltage or current. In some implementations, the common electrodes 128, the display electrodes, the first TFT array and the second TFT array (if used) are made of transparent material (e.g., indium-tin oxide (ITO)) to allow light to pass through from the side or the back of the touch screen assembly 200.

Figures 3A, 3B:
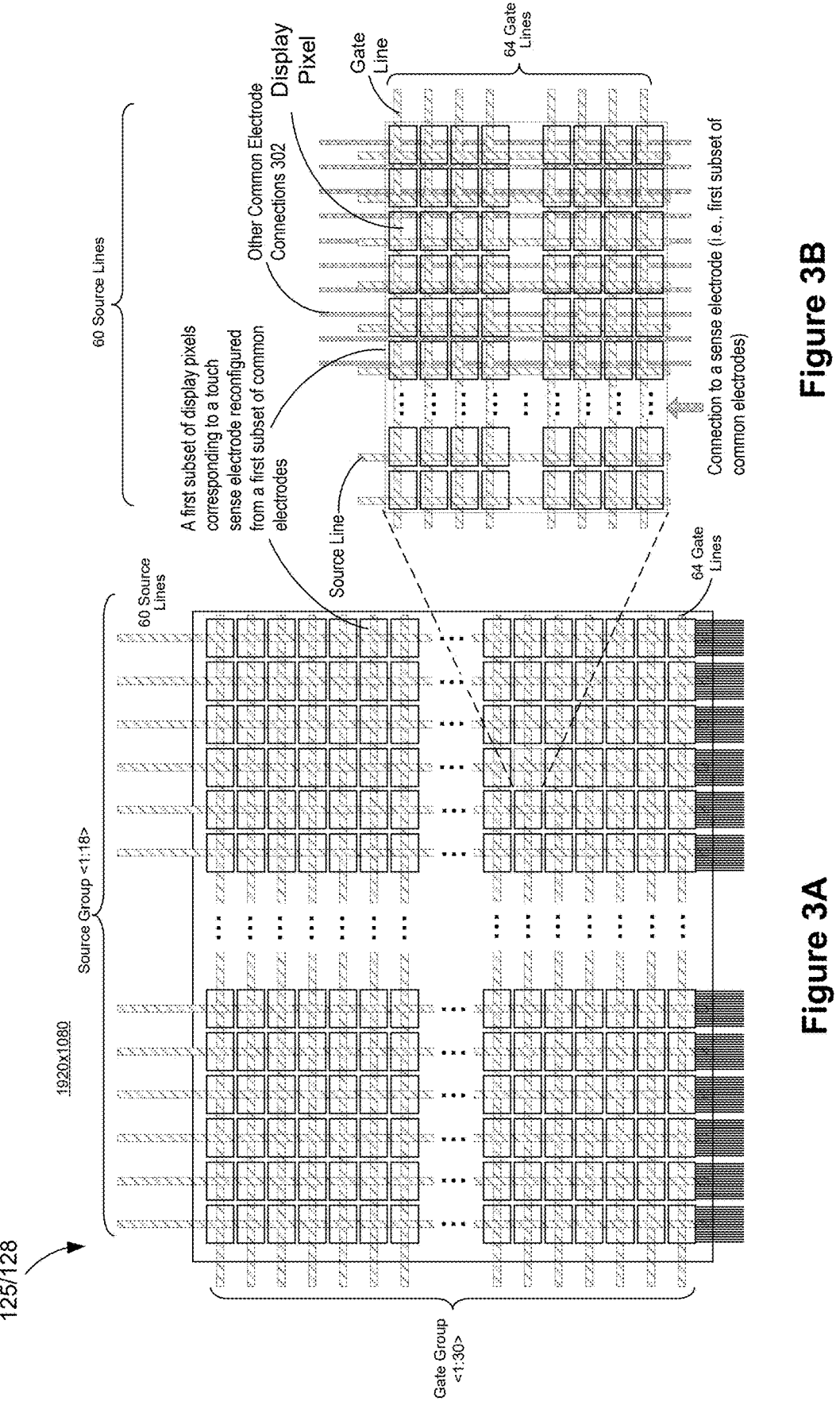
FIG. 3A is an example display pixel array that is reconfigured to operate as a capacitive sense array, in accordance with some implementations.
FIG. 3B is an example capacitive sense element that is reconfigured from a set of common electrodes of the display pixel array shown in FIG. 3A, in accordance with some implementations.

Optionally, the common electrode array 128 has a diamond pattern, a row-column pattern or a two-dimensional (2D) array of common electrodes (as shown in FIG. 3A). In some implementations related to the row-column pattern, the capacitive sense array 128 reconfigured from the common electrode array 128 includes row and column sense elements that can be expressed as a matrix of the intersections between row and column electrodes. In some implementations, the row and column sense elements are formed on two conductive layers that are electrically insulated from each other, and both of the conductive layers are formed on one of the top or bottom surfaces of the glass 212. In some implementations related to the 2D array of common electrodes, the 2D array of common electrodes includes a plurality of square or rectangular electrodes, and when reconfigured to the capacitive sense array 128, a set of adjacent common electrodes (e.g., a 2D array of 64×60 common electrodes) is grouped into a unit sense element for touch detection. The resolution of the common electrodes 128 is represented as the product of the number of rows and the number of columns associated with the common electrodes 128. The resolution of the reconfigured capacitive sense array 128 is represented as the product of the number of rows and the number of columns associated with the capacitive sense elements. The resolutions of the common electrodes 128 and the reconfigured capacitive sense array 128 could be identical or distinct.

FIG. 2B illustrates an example display pixel 250 driven by a display electrode 214 and a common electrode 128 in a display driving state, in accordance with some implementations. As explained above, the display pixel 250 is disposed between the display and common electrodes. A first TFT 216 is connected between a respective row line 218 and a respective column line 220, and configured to provide the first electrical signal to drive the display electrode 214 of the corresponding display pixel 250. In the case of LCD display pixels, the first electrical signal and another second electrical signal are applied onto the display and common electrodes, respectively, and therefore to the liquid crystal molecules corresponding to the display pixel 250. The molecules tend to untwist from their original twisted form, and cause a change in the angle of an incident light, thereby causing display of a color at a location corresponding to the display pixel 250.

The first TFT 216 is formed on the glass 204 to drive the display electrode 214 that is formed on the same glass substrate. More specifically, a gate layer, a semiconductor layer, a source/drain layer, one or more conductive layers and one or more intervening insulating layers are deposited on the glass 204. These material layers are lithographically patterned on the glass 204 to form functional part (e.g., gate, source and drain) of the first TFT 216 as well as the row (gate) line 218 and the column (source) line 220 of the first TFT 216. The first TFT 216 is configured to receive display driving signals from the processing device 110 (more specifically, the pixel drive circuit 102 of the processing device 110), and generates the first electrical signal to drive the display electrode 214 of the display pixel 250.

In some implementations (not shown in FIG. 2B), the display pixel 250 includes a second TFT to generate the second electrical signal to drive the common electrode 128. The second TFT is formed on the glass 212 to drive the common electrode 128 that is formed on the same glass substrate. A gate layer, a semiconductor layer, a source/drain layer, one or more conductive layers and one or more intervening insulating layers are deposited on the glass 212. These material layers are lithographically patterned on the glass 204 to form functional part (e.g., gate, source and drain) of the second TFT as well as a row (gate) line and a column (source) line of the second TFT. The first TFT is configured to receive the display driving signals from the processing device 110 (more specifically, the pixel drive circuit 102 of the processing device 110), and generates the second electrical signal to drive the common electrode 128 of the display pixel 250.

In an example, in the display driving state, the common electrode 128 is coupled to the ground (e.g., 0 V) or another reference voltage (e.g., 2 V and –2 V). The gate line 218 is coupled to a TFT turn-on voltage $V_{GH}$ (e.g., 13 V) to turn on the first TFT 216, such that the display electrode 214 is electrically driven by an electrical signal delivered to the source 220 of the first TFT 216. Optionally, the electrical signal of the source 220 has a magnitude of +5 V or –5 V, and the first electrical signal applied on the display electrode 214 tracks the electrical signal of the source. In another example, the common electrode 128 is coupled to the ground (e.g., 0V). The gate line 218 is coupled to a TFT turn-off voltage VGL (e.g., –10 V) to turn off the first TFT 216, such that the display electrode 214 is electrically decoupled from the electrical signal delivered to the source 220 of the TFT 216. Regardless of the magnitude of the electrical signal the source 220 has, the first electrical signal at the display electrode 214 does not track the electrical signal of the source 220.

FIG. 3A is an example display pixel array that is reconfigured to a capacitive sense array 128 in accordance with some implementations, and FIG. 3B is an example capacitive sense element that is reconfigured from a set of common electrodes 128 of the display pixel array shown in FIG. 3A, in accordance with some implementations. The display pixel array has a first resolution (e.g., 1920×1080), and the capacitive sense array 128 reconfigured from the display pixel array has a second resolution (e.g., 30×18). The display pixel array includes a plurality of display pixels (e.g., approximately 2M pixels arranged on the LCD 202), a plurality of display electrodes (e.g., approximately 2M display electrodes arranged on the glass 204), and a plurality of common electrodes. Each display pixel 250 is disposed between a display electrode 214 and a common electrode 128. Each display pixel 250 is accessed by a column line (also called a source line 220) and a row line (also called a gate line 218). The column and row lines are configured to control the respective TFT 216 associated with each display pixel 250 to drive the display electrode 214. In an example, the display pixel array has a first number (e.g., approximately 2M) of display pixels arranged to 1920 rows and 1080 columns.

In some implementations, the common electrodes 128 of the display pixel array are reconfigured to operate as the capacitive sense array 128 having a second resolution, such that the capacitive sense array 128 includes a second number (e.g., 540) of capacitive sense elements. In a specific example as shown in FIG. 3B, each sense element includes 64 rows and 60 columns of common electrodes 128, and therefore, the entire capacitive sense array 128 has the second resolution of 30×18. Stated another way, the display pixel array includes an array of 1920×1080 display pixels and is divided into 30×18 pixel sets, and each pixel set includes 64×60 display pixels. The common electrodes 128 corresponding to each pixel set are grouped into one capacitive sense element of the capacitive sense array 128. The pixel set corresponding to each sense element of the capacitive sense array 128 is driven by 64 gate lines and 60 source lines. In some implementations, the pixel set corresponding to each sense element of the capacitive sense array 128 includes a single common electrode, i.e., 64×60 display electrodes share the single common electrode. In some implementations, the pixel set corresponding to each sense element of the capacitive sense array 128 includes a third number (e.g., 64×60 or less) of common electrodes. Optionally, each of the third number of common electrodes corresponds to one or more display pixels in the pixel set. Optionally, the third number of common electrodes are electrically coupled to each other to form the corresponding sense element of the capacitive sense array 128.

Referring to FIG. 3A, in the touch sensing state, the second number of sense elements of the reconfigured capacitive sense array 128 are scanned for detecting a contact with or a proximity to a touch sensing surface associated with the display pixel array. Further, referring to FIG. 3B, in each sense element of the reconfigured capacitive sense array 128, the common electrodes 128 are grouped to one or more touch sense signals that are measured by the capacitive sense circuit 101 of the processing device 110 for touch detection in the touch sensing state. However, the common electrodes 128 in each sense element are at least capacitively coupled to the display electrodes 214 via the display pixels corresponding to the respective sense element, and to the gate lines 218 and the source lines 220 via the TFTs 216 corresponding to the respective sense element. In addition, the common electrodes 128 in each sense element are also capacitively coupled to touch sense signals 302 of other sense elements when the touch sense signals 302 are routed via the respective sense element to an edge of the display device 125 to gain access to the processing device 110. As such, when the common electrodes 128 of the display pixel array are reconfigured to operate as the capacitive sense array 128, parasitic capacitance is created for each sense element of the capacitive sense array 128 because of existence of the corresponding display electrode 250, gate lines 218, source lines 220, and signal lines connected to common electrodes of other sense elements.

Figure 4:
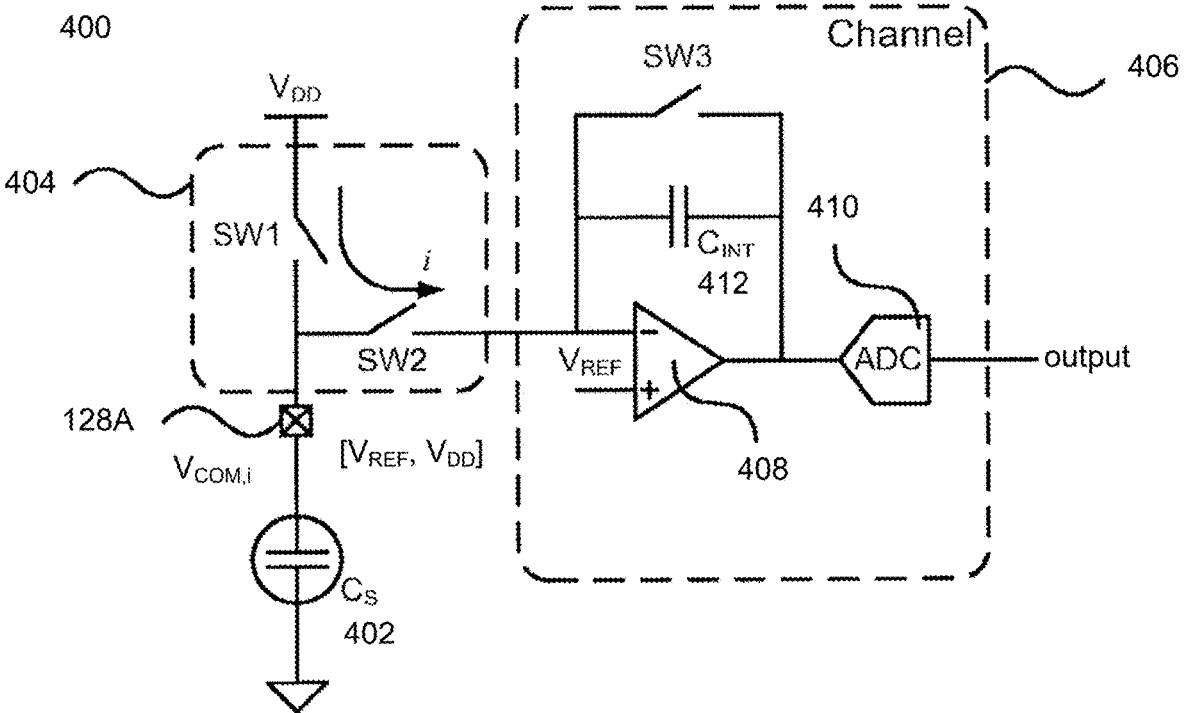
FIG. 4 is a circuit diagram for an example capacitance sense circuit configured to sense self capacitance of a sense element of a capacitive sense array, in accordance with some implementations.

FIG. 4 is a circuit diagram 400 for an example capacitance sense circuit 101 configured to sense self capacitance of a sense element 128A of a capacitive sense array 128, in accordance with some implementations. The sense element 128A of capacitive sense array 128 includes a first subset of common electrodes, and forms a self capacitor (Cs) 402 with respect to a ground. The self capacitor 402 is coupled to a switching network 404 and a self capacitance sensing channel 406 both of which are part of the capacitance sense circuit 101. An output of the self capacitance sensing channel 406 is further processed in the processing device 110 to detect a touch event on a touch sensing surface of the display device 125. The self capacitance sensing channel 406 further includes a charge integration amplifier 408 followed by an analog-to-digital converter (ADC) 410. The charge integration amplifier 408 receives a reference voltage $V_{REF}$, and is coupled to an integration capacitor $C_{INT}$ 412 and a switch SW3 to form a charge integrator.

The switching network 404 includes at least two switches SW1 and SW2. The switches SW1, SW2 and SW3 are synchronized to alternate the self capacitance sensing channel 406 and the self capacitor 402 between a reset cycle and a capacitance measurement cycle. At the reset cycle, the self capacitor 402 is electrically coupled to a supply voltage $V_{DD}$ while the integration capacitor 412 is short circuited to remove charge accumulated thereon. At the capacitance measurement cycle, the self capacitor 402 is gradually pulled to the reference voltage $V_{REF}$ while charge on the self capacitor 402 is redistributed to the integration capacitor 412. As such, to measure capacitance of the self capacitor 402, the voltage level driving the sense element 128A varies between the supply voltage $V_{DD}$ and the reference voltage $V_{REF}$, and an output signal measured at the output of the self capacitance sensing channel 406 indicates a capacitance variation of the self capacitor 402 and whether the self capacitor 402 is associated with a touch event.

In some implementations, at a touch sensing state, the supply voltage is 3.2V, and the reference voltage is 1.2V. The voltage level at the sense element 128A varies between 3.2V and 1.2V, and therefore, has a first voltage variation of 2V.

Figure 5B:
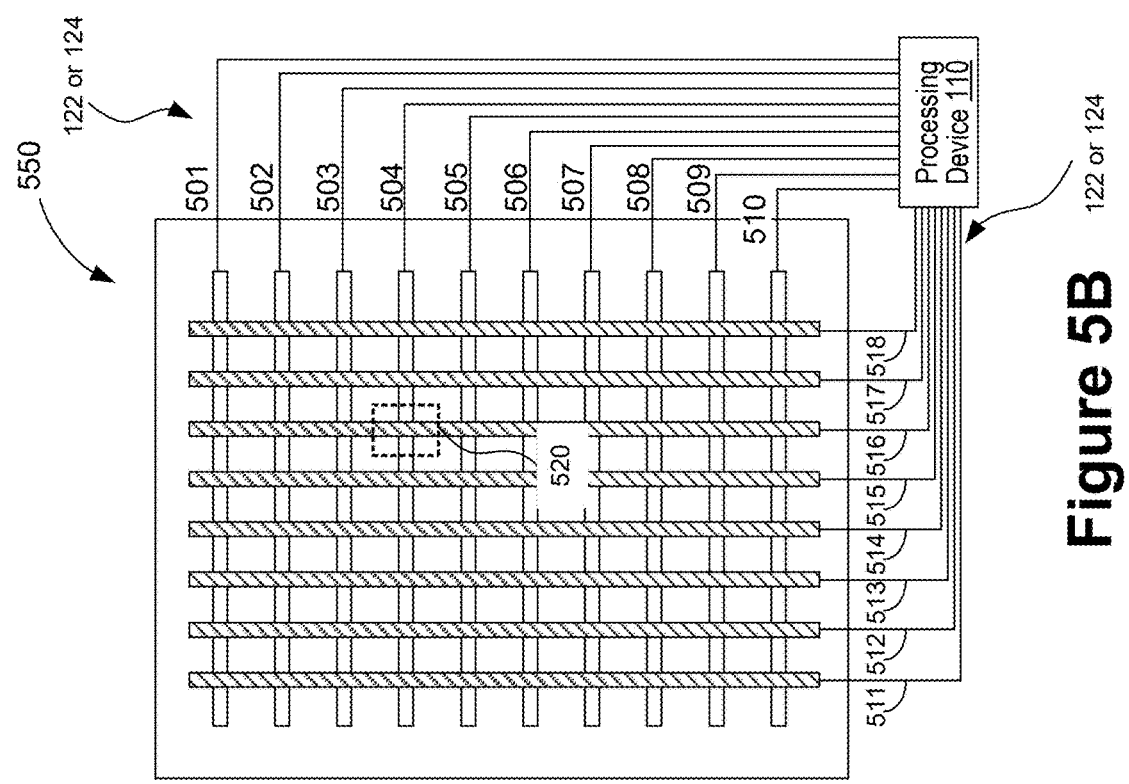
FIG. 5B is a diagram illustrates an example orthogonal electrode matrix used to form a capacitive sense array, in accordance with some implementations.
Figure 5A:
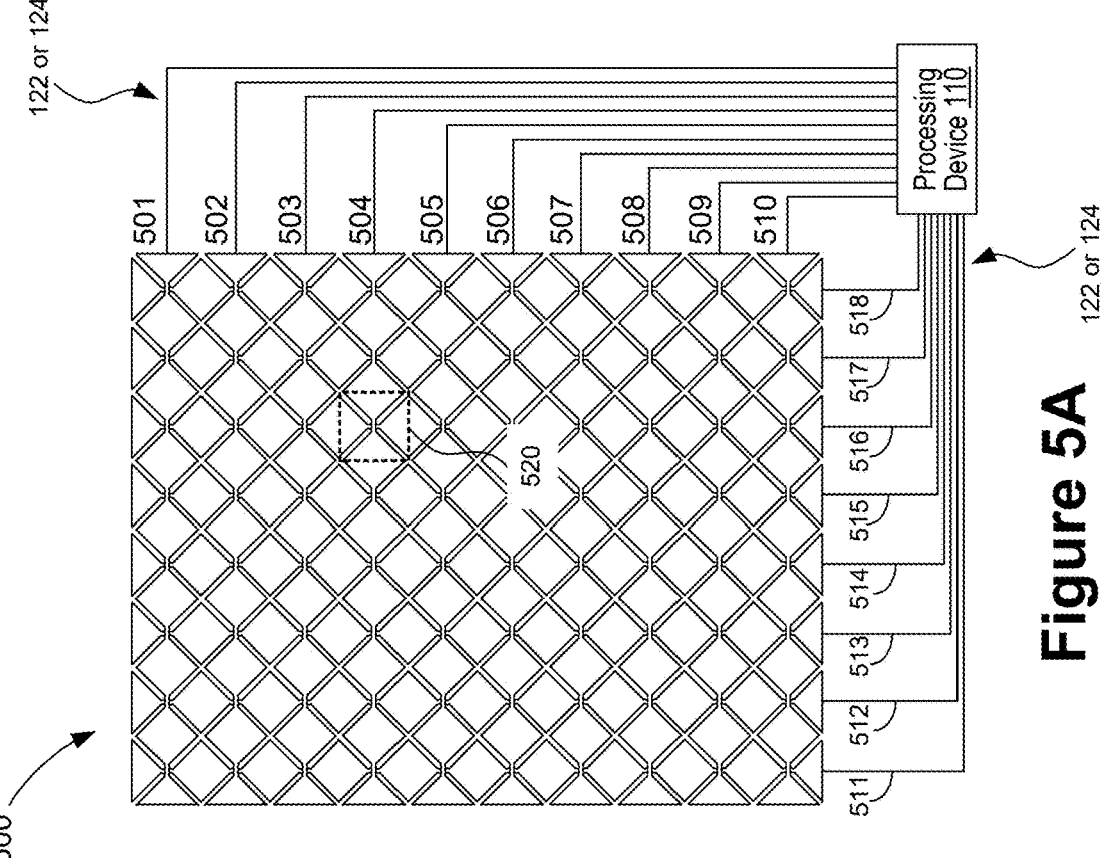
FIG. 5A is a diagram illustrating a solid diamond pattern used to form a capacitive sense array, in accordance with some implementations.

FIG. 5A is a diagram illustrating a solid diamond pattern 500 used to form a capacitive sense array 128, in accordance with some implementations. FIG. 5B is a diagram illustrating an example orthogonal electrode matrix 550 used to form a capacitive sense array 128, in accordance with some implementations. When the solid diamond pattern 500 or the orthogonal electrode matrix 550 is applied in a capacitive sense array 128, the capacitive sense array 128 includes a plurality of row sense electrodes 501-510 and a plurality of column sense electrodes 511-518. The row and column sense electrodes 501-518 are connected to a processing device 110 (which may include the functionality of a capacitance sensing circuit 101) by the bus 122, and configured to provide capacitive sense signals to the processing device 110. In some implementations, the processing device 110 may perform transmitting-receiving scans of the capacitive sense array 128 to measure a mutual capacitance value associated with each of the intersections between a row sense electrode and a column sense electrode in the capacitive sense array 128. The measured mutual capacitances are further processed at the processing device or at a host 150 to determine locations of one or more contacts on the capacitive sense array 128.

Referring to FIG. 5A, the electrodes of the capacitive sense array 128 form a single solid diamond (SSD) pattern. In some implementations, each intersection between a row electrode and a column electrode defines a unit cell. Each point within the unit cell is closer to the associated intersection than to any other intersection. For example, the unit cell 520 contains the points that are closest to the intersection between the row electrode 504 and the column electrode 516.

In some implementations, a capacitive touch sensing system may collect data from the entire touch sensing surface of sense array 128 by performing a scan to measure capacitances of the unit cells in the touch sensing surface, then process the touch data serially or in parallel with a subsequent scan. For example, a system that processes touch data serially may collect raw capacitance data from each unit cell of the entire touch sensing surface, and filter the raw data. Based on the filtered raw data, the system may determine local maxima (corresponding to local maximum changes in capacitance) to calculate positions of fingers or other conductive objects, then perform post processing of the resolved positions to report locations of the conductive objects, or to perform other functions such as motion tracking or gesture recognition. In some implementations, the capacitive touch sensing system may perform mutual capacitance sensing of the touch sensing surface (e.g., sense array 128) by individually sensing each intersection between a row electrode and a column electrode. Thus, a total number of sense operations for a capacitive sense array (e.g., sense array 128) having X rows and Y columns is X×Y. In some implementations, performing a mutual capacitance measurement of a unit cell formed at the intersection of a row electrode and a column electrode includes applying a signal (TX) to one electrode and measuring characteristics of the signal on another electrode resulting from the capacitive coupling between the electrodes.

Although the row and column electrodes appear as bars, elongated rectangles or diamonds in FIGS. 5A and 5B, various tessellated shapes (e.g., rhomboids and chevrons) may also be used.

Controlling Phase Shifts for EMI Harmonic Amplitude Reduction

A first approach to reduce electromagnetic interference (EMI) is to apply phase shifts to drive signals in a frame. An extent of phase shifts within a frame is defined by phase offsets of respective trains of periodic pulses of drive signals. Further insights into the implementation of phase shifts are discussed in the following description.

Figure 6:
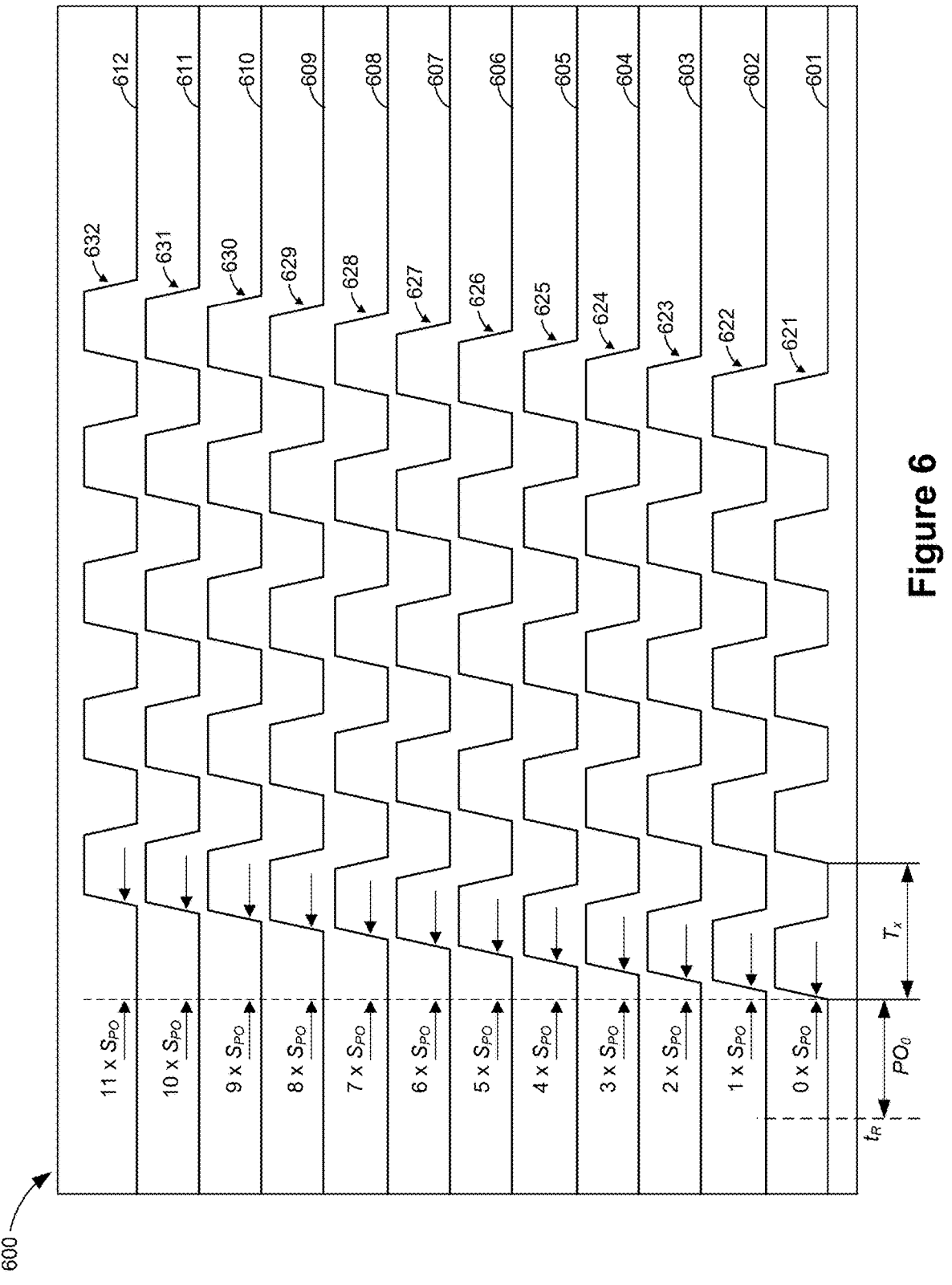
FIG. 6 is a temporal diagram of an example group of drive signals having predefined phase offsets with respect to one another, in accordance with some implementations.

FIG. 6 is a temporal diagram of an example group of drive signals 600 having predefined phase offsets with respect to one another, in accordance with some implementations. The example group of drive signals 600 includes 12 distinct drive signals (e.g., the first drive signal 601 to the twelfth drive signal 612). The 12 distinct drive signals 601-612 are configured to drive 12 distinct touch sensing regions of a touch sensing panel, which includes a capacitive sensing array 128 (FIGS. 1 and 3A). In some implementations, the touch sensing panel includes only the 12 distinct touch sensing regions, and is scanned by the 12 distinct touch sensing regions to form a frame of touch data. Each drive signal of the example group of drive signals 600 corresponds to a distinct one of touch sensing regions of a touch sensing panel. Each drive signal of the example group of drive signals 600 includes a train of periodic pulses with a transmitting period $T_x$. For example, a first drive signal 601 includes a train of 5 periodic pulses having the transmitting period $T_x$.

In some implementations, the example group of drive signals 600 includes a first drive signal 601 and a remainder of the drive signals 600 that is distinct from the first drive signal 601. For each drive signal of the remainder of the drive signals 600, a phase shift of the respective train of periodic pulses is measured with respective to a first train of 621 of the first drive signal 601. The first train 621 of the first drive signal 601 has no phase offset, i.e., the phase offset of the first train 621 is 0. The phase offsets of the remainder of the drive signals 622-632 are $1S_{PO}$, $2S_{PO}$, $3S_{PO}$, $4S_{PO}$, $5S_{PO}$, $6S_{PO}$, $7S_{PO}$, $8S_{PO}$, $9S_{PO}$, $10S_{PO}$, and $11S_{PO}$, respectively, where $S_{PO}$ is a predefined phase step in unit of time. It is noted that in some implementations, phase offsets of the group of drive signals 600 are measured with respect to any of the drive signals 600 (e.g., a drive signal 630), which is not limited to the first drive signal 601.

More specifically, in an example, the first drive signal 601 corresponds to a first touch sensing region of the touch sensing panel. A phase offset of the first train 621 of five periodic pulses is set to 0. A k-th drive signal corresponds to a k-th touch sensing region of the touch sensing panel, and includes a k-th train of five periodic pulses having a phase offset of $(k-1)S_{PO}$ with respect to the first train 621, where k is an integer between 2 and 12, inclusively. For example, the second drive signal 602 corresponds to a second touch sensing region of the touch sensing panel, and includes the second train 622 of five periodic pulses having a phase offset of $1S_{PO}$ with respect to the first train 621.

Alternatively, in some implementations, for each of the group of drive signals 600, a phase shift of the respective train of periodic pulses is measured with respective to a fixed reference time $t_R$. The first train 621 of periodic pulses of the first drive signal 601 has a constant phase offset $PO_0$ with respect to the fixed reference time $t_R$.

A train of periodic pulses includes at least one pulse. As explained above, in some implementations, the train of periodic pulses includes five periodic pulses. In some implementations, a train of periodic pulses includes a number of periodic pulses, and the number is not equal to five.

In some implementations, for each of the remainder of drive signals of the first drive signal 601, a phase offset of a respective train of periodic signals is selected from a predetermined range (e.g., from microsecond (μs) to millisecond (ms)). In some implementations, for each of the remainder of drive signals of the first drive signal 601, a phase offset of a respective train of periodic signals is less than or equal to a half of a period of the respective train of periodic pulses (e.g., ≤a half of the transmitting period $T_x$). In other words, a maximum phase offset of the trains is not more than the half of the transmitting period $T_x$. In an example, a transmitting frequency of the trains of periodic pulses 621-632 is 100 kHz, and the corresponding transmitting period $T_x$ is 10 μs. The maximum phase offset (e.g., $11SP_0$) is equal to a half of the transmitting period $T_x$ (e.g., equal to 5 μs). The predefined phase step $S_{PO}$ is approximately 0.45 μs. Conversely, in some implementations, for at least one of the remainder of drive signals of the first drive signal 601, a phase offset of a respective train of periodic signals is greater than a half of a period of the respective train of periodic pulses.

In some implementations, for each drive signal of the remainder of the drive signals 621-632, a respective phase offset of a respective train of periodic pulses is selected from a plurality of predefined phase offset values. The predefined phase offset values include k distinct phase offset values, where k is an integer greater than one. In an example, two predefined offset values (e.g., 0 and $S_{PO}$) are available. In another example, there are 12 distinct phase offset values including 0. Each of the 12 drive signals 601-612 corresponds to a distinct one of the 12 distinct phase offset values. In some implementations, the phase offsets of the drive signals increase successively based on locations of the corresponding 12 distinct touch sensing regions on the touch sensing panel. Alternatively, in some implementations, the phase offsets of the drive signals are randomly selected, independently of the locations of the corresponding 12 distinct touch sensing regions on the touch sensing panel.

In some implementations, a plurality of predefined phase offset values includes an ordered sequence of phase offset values that are evenly spaced according to a constant phase offset $PO_0$ and/or a phase offset step $S_{PO}$. Constant phase offset $PO_0$ and phase offset step $S_{PO}$ are selected from predefined temporal ranges. For instance, when the touch sensing panel includes k (e.g., k being an integer greater than one) touch sensing regions that correspond to k drive signals, one possible choice of the ordered sequence of the phase offset values is $PO_0$, $PO_0+1S_{PO}$, $PO_0+2S_{PO}$, $PO_0+3S_{PO}$, . . . , and $PO_0+(k-1)S_{PO}$. This shows an incremental phase allocation, where the phase offset values are evenly spaced by $1S_{PO}$ according to the constant phase offset $PO_0$ and the phase offset step $S_{PO}$. In some implementations, the constant phase offset $PO_0$ is equal to 0, yielding the order sequence of phase offset values as $S_{PO}$, $2S_{PO}$, $3S_{PO}$, . . . , and $(k-1)S_{PO}$. In another instance, the plurality of predefined phase offset values are defined as $1S_{PO}$, $3S_{PO}$, $5S_{PO}$, . . . , and $(2k-1)S_{PO}$, where k is an integer greater than one. As a result, the plurality of predefined phase offset values include an ordered sequence of phase offset values that are evenly spaced by $2S_{PO}$. In the case of the example group of drive signals 600, the phase offsets (e.g., $1S_{PO}$, $2S_{PO}$, $3S_{PO}$, . . . , and $11S_{PO}$) of the trains 622-632 are evenly spaced by $1S_{PO}$. In some implementations, the phase offsets of the group of drive signals 601-612 have at least two different values, e.g., selected from the plurality of predefined phase offset values. Further, in some implementations, a subset of two or more drive signals has the same phase offsets.

In some implementations, a phase difference between two neighboring predefined phase offset values can be further determined by the selected phase offset step $S_{PO}$. In one example, the phase difference between two neighboring predefined phase offset values is further determined as $0.5S_{PO}$. In this circumstance, one possible choice of the ordered sequence of the phase offset values is $PO_0$, $PO_0+0.5S_{PO}$, $PO_0+1.0S_{PO}$, $PO_0+1.5S_{PO}$, . . . , and $PO_0+(k-1)\times0.5S_{PO}$. Another possible choice of the ordered sequence of the phase offset values is $PO_0+0.75S_{PO}$, $PO_0+1.25S_{PO}$, $PO_0+1.75S_{PO}$, $PO_0+2.25S_{PO}$, . . . , and $PO_0+0.75S_{PO}+(k-1)\times0.5S_{PO}$.

FIGS. 7A-7F illustrate four example driving schemes (e.g., 700a, 700b, 700c, and 700d) implemented within a frame for the touch sensing panel to manage drive signals and control their associated phase shifts, in accordance with some implementations. In each driving scheme, a respective frame waveform within a frame incorporates a periodic slot signal that synchronize drive signals. In other words, drive signals (e.g., with or without phase offsets) are grouped in relation to the periodic slot signal, such that modulation of touch sensing panel scanning can be realized to adjust EMI harmonic amplitudes.

Figure 7A:
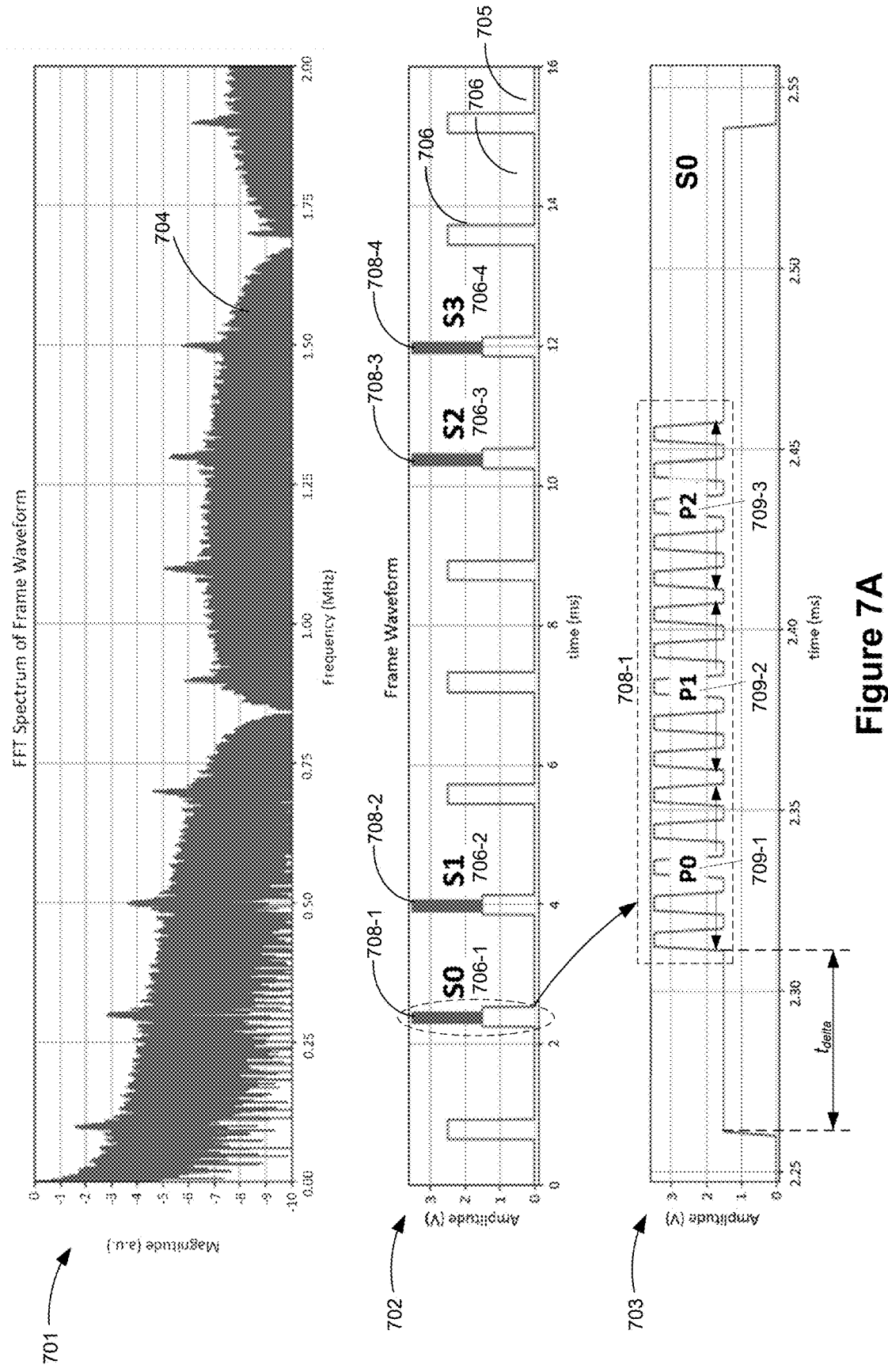
FIGS. 7A-7F illustrate four example driving schemes implemented within a frame for a touch sensing panel to manage drive signals and control their associated phase shifts, in accordance with some implementations.
Figure 7B:
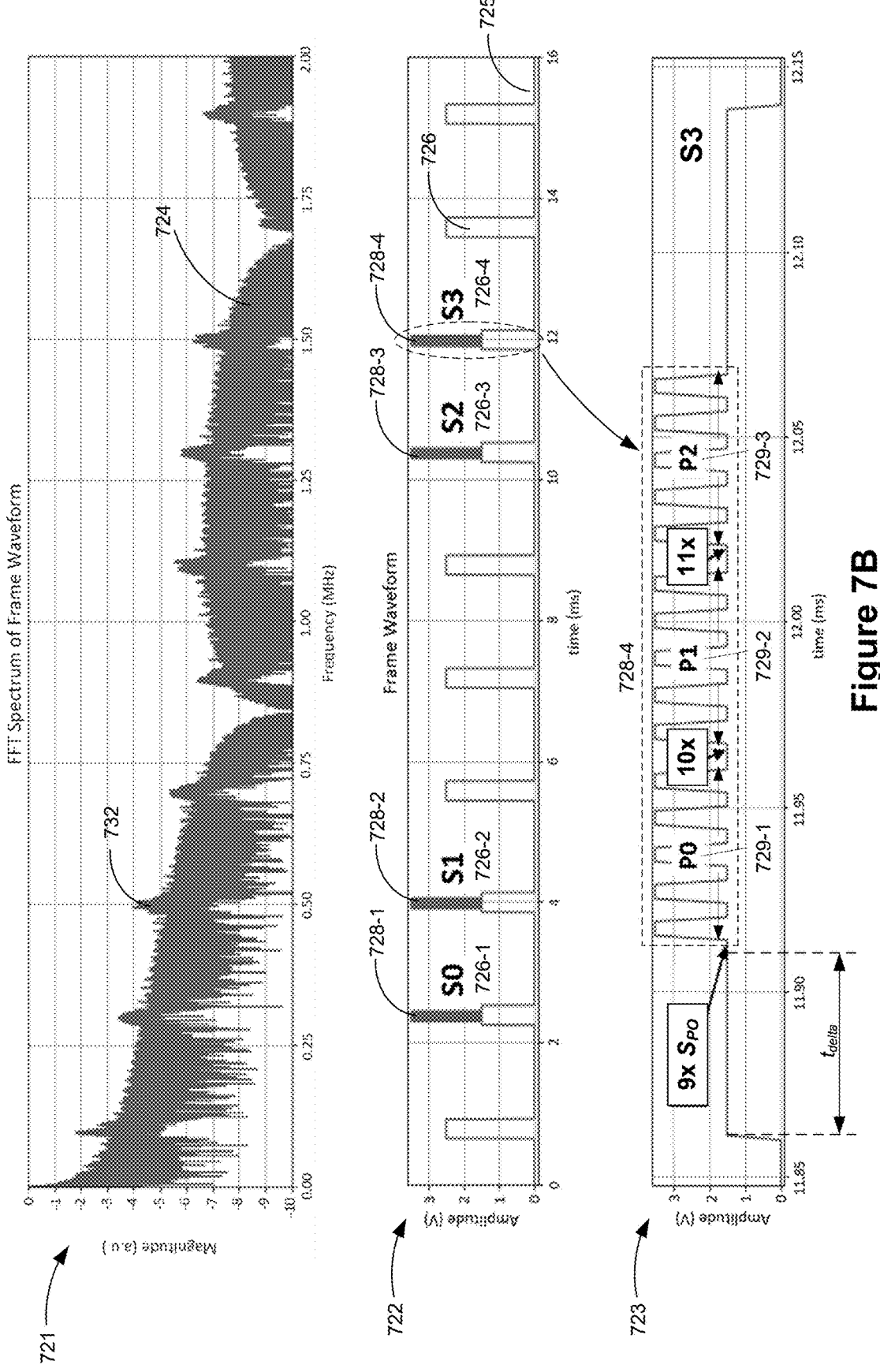

FIGS. 7A-7B illustrates a first example driving scheme 700a implemented within a frame. The first example driving scheme 700a adopts a periodic slot signal at a slot frequency about 750 Hz, greater than a predefined frame refresh rate of 60 Hz. Specifically, within the first example driving scheme 700a, a first frame waveform 705 includes twelve drive signals that does not incorporate phase shifts, while a second frame waveform 725 also includes twelve drive signals that applies phase shifts.

Turning to FIG. 7A, fast Fourier transform (FFT) spectrum of frame waveform plot 701 illustrates a FFT spectrum 704 of the first frame waveform 705 of the first example driving scheme 700a. An x axis of the frame waveform plot 701 represents frequency in unit of MHz ranging from 0 MHz to 2 MHz. The FFT spectrum 704 include ten harmonic peaks. In some embodiments, the FFT spectrum 704 a plurality of harmonic peaks 714. Amplitudes of the harmonic peaks 714 of the FFT spectrum 704 are reduced and broadened compared to amplitudes of harmonic peaks of an FFT spectrum corresponding to frame waveforms having no phase shifts.

Frame waveform plot 702 illustrates the first frame waveform 705 of the first example driving scheme 700a. An x axis of the frame waveform plot 702 represents time in unit of millisecond (ms) ranging from 0 ms to 16 ms, and an y axis of the frame waveform plot 702 represents amplitude in unit of voltage (V) ranging from 0 V to about 3.5 V. As discussed, the first frame waveform 705 of the first example driving scheme 700a incorporates a periodic slot signal 706. The first frame waveform 705 of the first example driving scheme 700a includes the periodic slot signal 706 that has a ON-time period (e.g., a high-voltage period) in each slot cycle. Moreover, the periodic slot signal 706 includes four slots S0 706-1, S1 706-2, S2 706-3, and S3 706-4, where each slot is associated with a respective ON-time period. Furthermore, the twelve drive signals of the first frame waveform 705 are synchronized with the slots 706-1 to 706-4, such that the twelve drive signals are evenly grouped into four drive groups (e.g., a first drive group to a fourth drive group, 708-1 to 708-4). Each of the drive groups includes a subset of three drive signals that are enabled in the respective slot (e.g., the respective ON-time period). The four drive groups 708-1 to 708-4 of the first frame waveform 705 are synchronized. Additionally, the twelve drive signals of the first frame waveform 705 are selected from the example group of drive signals 600 in reference to FIG. 6.

Frame waveform plot 703 illustrates a zoomed view of the first drive group 708-1 that is synchronized with the slot S0 706-1. An x axis of the frame waveform plot 703 represents time in unit of millisecond (ms) ranging from 2.25 ms to 2.55 ms, and an y axis of the frame waveform plot 703 represents amplitude in unit of voltage (V) ranging from 0 V to about 3.5 V. The first drive group 708-1 includes a first drive signal 709-1, a second drive signal 709-2, and a third drive signal 709-3, where the first drive signal 709-1 starts at $t_{delta}$ after a rising edge of the slot S0. Each drive signal 709-1 to 709-3 includes a respective train of five periodic pulses. As discussed above, the first frame waveform 705 of the first example driving scheme 700a does not incorporate phase shifts. Therefore, the drive signals 709-1 to 709-3 of the first drive group 708-1 are continuous without a delay in phase. Analogously, drive signals of the drive groups 708-2, 708-3, and 708-4 are continuous without a delay in phase.

Turning to FIG. 7B, as discussed, the second frame waveform 725 applies phase shifts. Specifically, respective trains of periodic pulses of drive signals within the second frame waveform 725 are phase-shifted with phase offsets relative to each other.

FFT spectrum of frame waveform plot 721 illustrates a FFT spectrum 724 of the second frame waveform 725 of the first example driving scheme 700a. Similar to the FFT spectrum 704 of the first frame waveform 705, the FFT spectrum 724 of the second frame waveform 725 also includes ten harmonic peaks. In some embodiments, the FFT spectrum 724 includes a plurality of harmonic peaks 732. Amplitudes of the harmonic peaks 732 of the FFT spectrum 724 are reduced and broadened compared to amplitudes of harmonic peaks of an FFT spectrum corresponding to frame waveforms having no phase shifts.

Frame waveform plot 722 illustrates the second frame waveform 725 of the first example driving scheme 700a. Similar to the first frame waveform 705, the second frame waveform 725 includes a periodic slot signal 726 that has a ON-time period (e.g., a high-voltage period) in each slot cycle. Moreover, the periodic slot signal 726 includes four slots S0 726-1, S1 726-2, S2 726-3, and S3 726-4, associated with four respective ON-time periods, respectively. Furthermore, the twelve drive signals of the second frame waveform 725 are synchronized with the slots 726-1 to 726-4, such that the twelve drive signals are evenly grouped into four drive groups (e.g., a first drive group to a fourth drive group, 728-1 to 728-4). Each of the drive groups includes a subset of three drive signals that are enabled in the respective slot. The four drive groups 728-1 to 728-4 of the second frame waveform 725 are synchronized. Additionally, the twelve drive signals of the second frame waveform 725 are selected from the example group of drive signals 600 in reference to FIG. 6.

Frame waveform plot 723 illustrates a zoomed view of the fourth drive group 728-4 that is synchronized with the slot S3 726-4. An x axis of the frame waveform plot 723 represents time in unit of millisecond (ms) ranging from 11.85 ms to 12.15 ms, and an y axis of the frame waveform plot 723 represents amplitude in unit of voltage (V) ranging from 0 V to about 3.5 V. The fourth drive group 728-4 includes a first drive signal 729-1, a second drive signal 729-2, and a third drive signal 729-3. Each of three drive signals 729-1, 729-2, and 729-3 includes a respective train of five periodic pulses. Different from the trains of drive signals 709-1 to 709-3 illustrated in FIG. 7A, each train of one of drive signals 729-1 to 729-3 further includes a phase offset. Specifically, phase offsets of the respective trains of drive signals 729-1, 729-2, and 729-3 are $9S_{PO}$, $10S_{PO}$, and $11S_{PO}$, respectively. Consequently, the first drive signal 729-1 starts at $t_{delta}+9S_{PO}$ after a rising edge of the slot S3 726-4, the second drive signal 729-2 starts at $10S_{PO}$ after the first drive signal 729-1, and the third drive signal 729-3 starts at $11S_{PO}$ after the second drive signal 729-2. Analogously, drive signals of other three drive groups 728-1, 728-2, and 728-4 of the second frame waveform 725 start with a delay in phase compared to their corresponding drive signals of the first frame waveform 705.

Figure 7C:
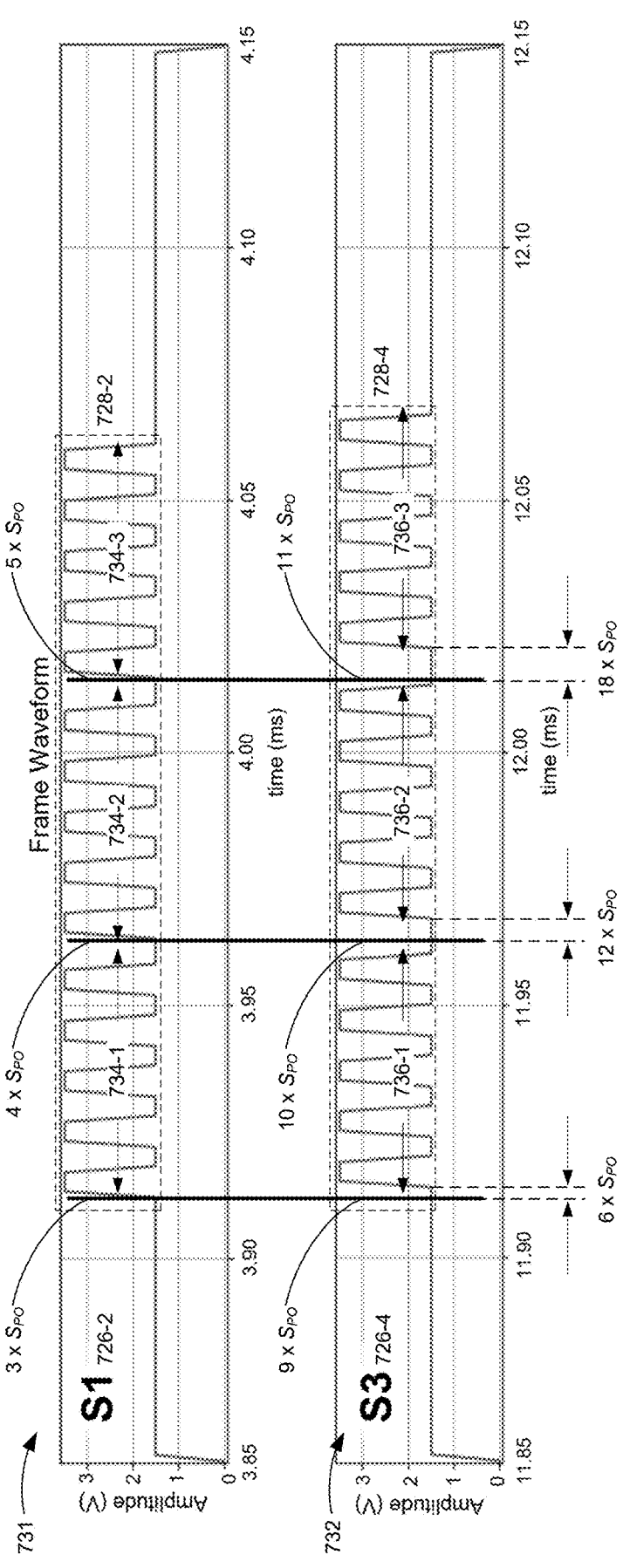

FIG. 7C illustrates a comparison of phase offsets between the second drive group 728-2 and the fourth drive group 728-4 of the second frame waveform 725. As shown in frame waveform plot 731, three drive signals are grouped into the second drive group 728-2 and enabled in the slot S1 726-2. Similarly, three drive signals (e.g., the first drive signal 729-1 to the third drive signal 729-3) are grouped into the fourth drive group 728-4 and enabled in the slot S3 726-4. The second drive group 728-2 and the fourth drive group 728-4 of the second frame waveform 725 are synchronized. Respective trains of the drive signals 734-1 to 734-3 of the second drive group 728-2 incorporate phase offsets of $3S_{PO}$, $4S_{PO}$, and $5S_{PO}$, respectively, while respective trains of the drive signals 736-1 to 736-3 of the fourth drive group 728-4 incorporate phase offsets of $9S_{PO}$, $10S_{PO}$, and $11S_{PO}$, respectively. As a result, the train of the first drive signal 736-1 of the fourth drive group 728-4 starts $6S_{PO}$ (e.g., $9S_{PO}-3S_{PO}=6S_{PO}$) later than its corresponding train of the first drive signal 734-1 of the second drive group 728-2 with respect to rising edges of the slots S1 726-2 and S3 726-4. Similarly, the train of the second drive signal 736-2 and the train of the third drive signal 736-3 start $12S_{PO}$ (e.g., $9S_{PO}+10S_{PO}-3S_{PO}-4S_{PO}=12S_{PO}$) and $18S_{PO}$ (e.g., $9S_{PO}+10S_{PO}+11S_{PO}-3S_{PO}-4S_{PO}-5S_{PO}=18S_{PO}$) later than their counterparts (e.g., 734-2 and 734-3) of the second drive signal waveform 728-2, respectively. Specifically, for each drive signal of the fourth drive group 728-4, the respective phase offset of the respective train is greater than the respective phase offsets of the respective trains of the second drive signal waveform 728-2.

Figure 7D:
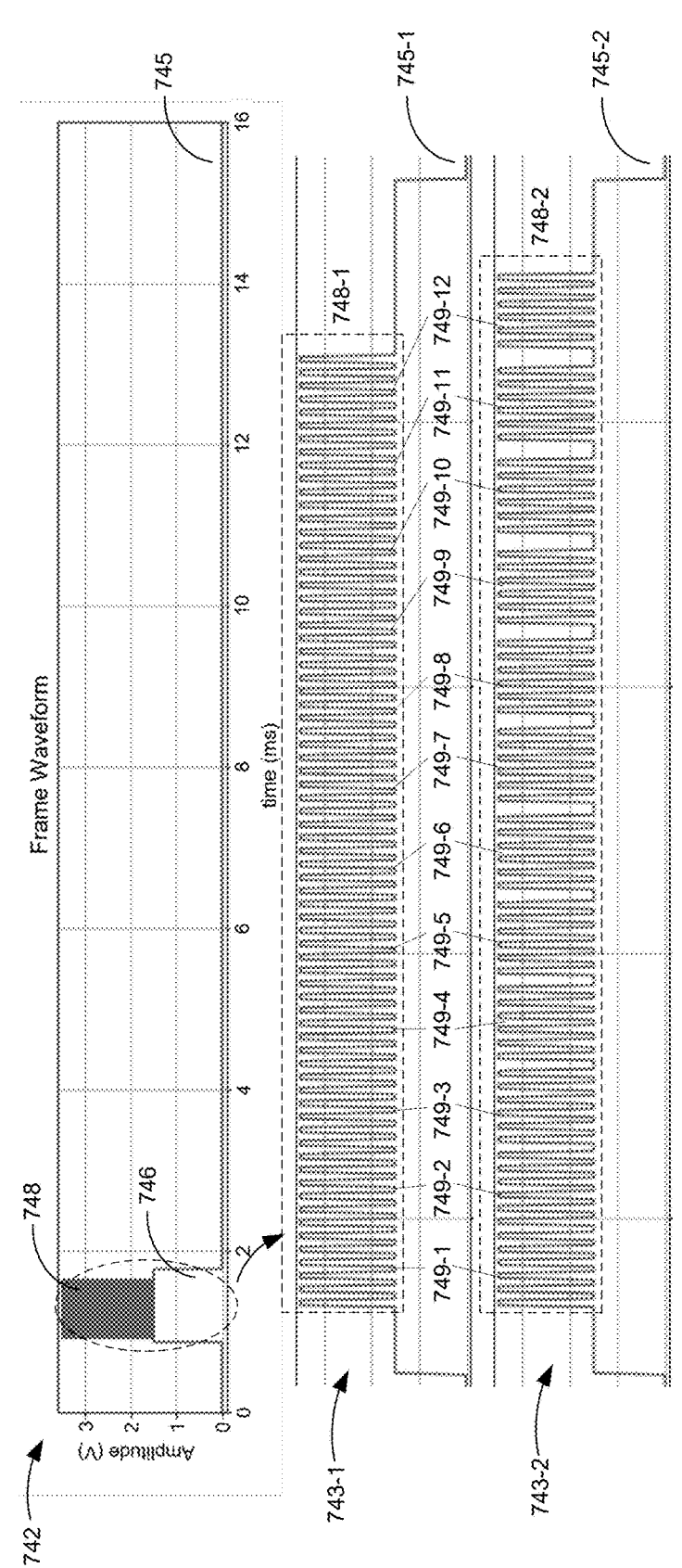

FIG. 7D illustrates a second example driving scheme 700b implemented within a frame. Different from the first example driving scheme 700a, the second example driving scheme 700b adopts only a slot 746 (e.g., a long slot) operating at a slot frequency about 60 Hz, matching the predefined frame refresh rate of 60 Hz.

Frame waveform plot 742 illustrates a frame waveform 745 (e.g., a first frame waveform 745-1 or a second frame waveform 745-2) that includes the slot 746 with a time span of about 1 millisecond (ms) for incorporating drive signals. Similar to the first example driving scheme 700a in reference to FIGS. 7A-7B, the frame waveform 745 of the second example driving scheme 700b includes twelve drive signals (e.g., 749-1 to 749-12), which are selected from the example group of drive signals 600 in reference to FIG. 6. Specifically, the drive signals 749-1 to 749-12 are synchronized with the slot 746. Moreover. The drive signals 749-1 to 749-12 are grouped into a drive group 748, such that the drive signals 749-1 to 749-12 are enabled in the slot 746.

Frame waveform plot 743-1 illustrates a zoomed view of the drive group 748-1 of the first frame waveform 745-1, where respective trains of the drive signals 749-1 to 749-12 of the drive group 748-1 do not adopt phase shifts. As shown in the frame waveform plot 743-1, the drive signals 749-1 to 749-12 of the drive group 748-1 are continuous without a delay in phase. On the other hand, frame waveform plot 743-2 illustrates a zoomed view of the drive group 748-2 of the second frame waveform 745-2, where respective trains of the drive signals 749-1 to 749-12 of the drive group 748-2 incorporate phase shifts. For the second frame waveform 745-2, a start time of respective train is later than that of corresponding train of the drive group 748-1, depending on an accumulated phase offset prior to the respective train. For instance, the drive signals 749-1 to 749-12 of the second frame waveform 745-2 are selected as the first to twelfth drive signals (e.g., 601 to 612) of the example group of drive signals 600, respectively. In this circumstance, a start time of the respective train of the twelfth drive signal 749-12 of the second frame waveform 745-2 is $66S_{PO}$ (e.g., $0S_{PO}+1S_{PO}+2S_{PO}+3S_{PO}+4S_{PO}+5S_{PO}+6S_{PO}+7S_{PO}+8S_{PO}+9S_{PO}+10S_{PO}+11S_{PO}$), later than a corresponding train of the drive group 748-1. Furthermore, for each drive signal of the second drive group 748-2, the respective phase offset of the respective train is greater than the respective phase offsets of the respective trains of the first drive group 748-1.

Figure 7E:
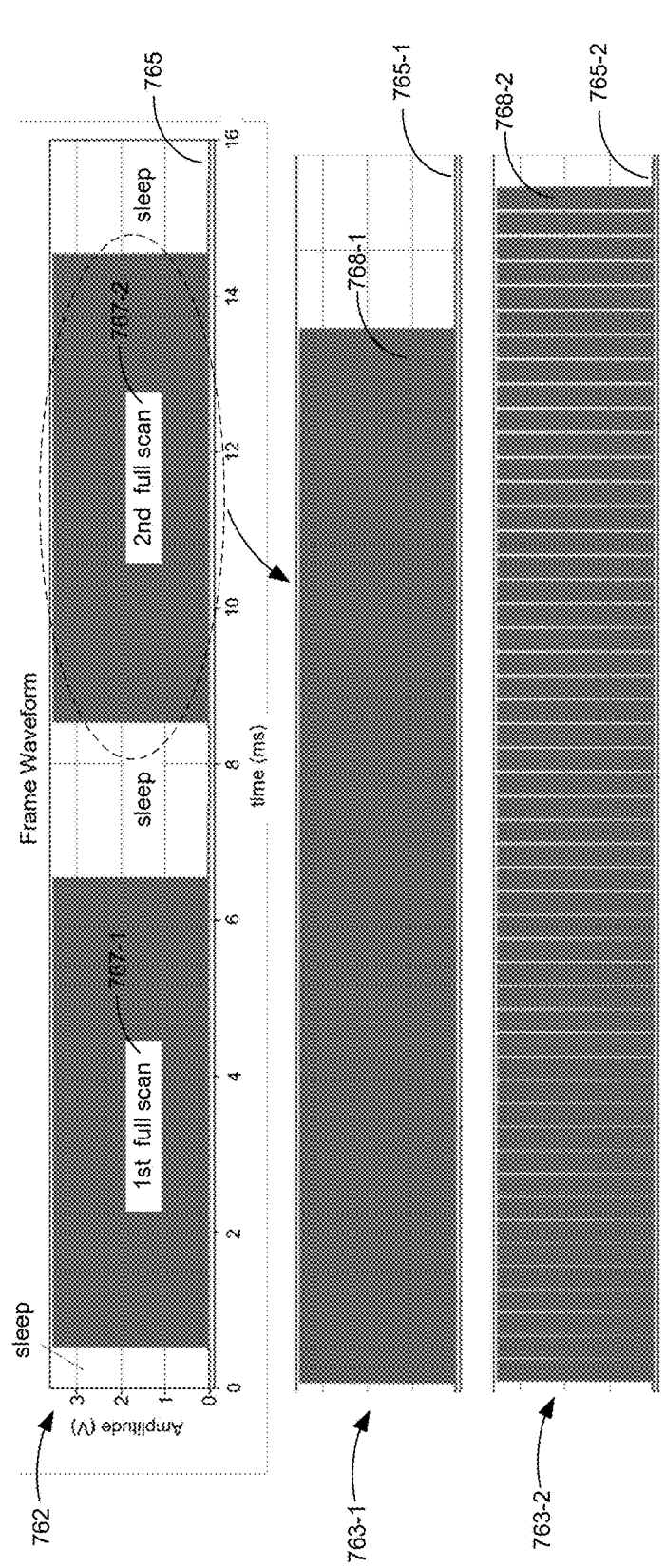

FIG. 7E illustrates a third example driving scheme 700c implemented within a frame. Different from the first and the second examples driving scheme 700a and 700b, the third example driving scheme 700c includes a first full scan 767-1 and a second full scan 767-2 within one frame operating at the predefined frame refresh rate of 60 Hz, resulting in a scan rate of 120 Hz.

Frame waveform plot 762 illustrates a frame waveform 765 (e.g., a first frame waveform 765-1 or a second frame waveform 765-2) that includes the first full scan 767-1 and the second full scan 767-2. In some implementations, time gaps between the full scans (e.g., the first full scan 767-1 and the second full scan 767-2) can be a sleep time for lowering power consumption. Moreover, each full scan of the first full scan 767-1 and the second full scan 767-2 includes 50 drive signals (e.g., 768-1 and 768-2) corresponding to 50 transmitters (e.g., one drive signal per one transmitter). Furthermore, each drive signal includes a train of 12 periodic pulses. Frame waveform plot 763-1 illustrates a zoomed view of drive signals of the second full scan 767-2, where the drive signals do not incorporate phase offsets. On the other hand, frame waveform plot 763-2 illustrates a zoomed view of drive signals of the second full scan 767-2, where the drive signals adopt phase offsets. As shown in the frame waveform plot 763-2, each of the drive signals 768-2 starts later than its counterpart of the drive signals 768-1.

Figure 7F:
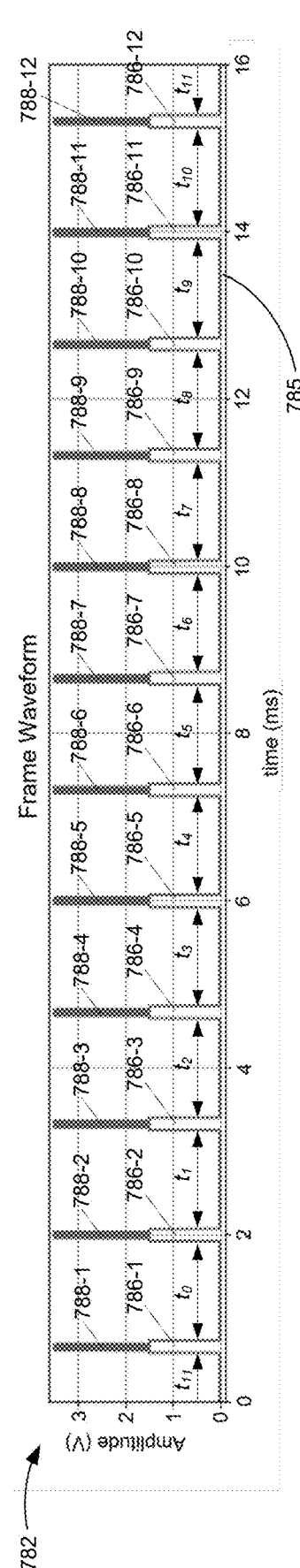

FIG. 7F illustrates a fourth example driving scheme 700d implemented within a frame. Similar to the first and the second example driving schemes 700a-700b, the fourth example driving scheme 700d incorporates a slot signal with 12 slots within the frame. Different from the situations in the first and the second example driving schemes 700a-700b, in the fourth example driving scheme 700d, phase shifts are applied to slots instead of drive signals.

Frame waveform plot 782 illustrates a frame waveform 785 of the fourth example driving scheme 700d. As shown in the frame waveform plot 782, the frame waveform 785 includes 12 slots (e.g., slot 786-1 to 786-12), and each slot includes only one drive signal (e.g., 788-1 to 788-12). Moreover, the frame waveform 785 of the fourth example driving scheme 700d includes 12 drive signals, which are synchronized with 12 slots 786-1 to 786-12 (e.g., 12 ON-time periods of the slot signal within the frame). The 12 drive signals 788-1 to 788-12 is grouped into 12 drive groups, where each drive group includes only one drive signal. Additionally, the 12 drive groups (e.g., the 12 drive signals 788-1 to 788-12) are synchronized.

As discussed, phase offsets (e.g., phase shifts) are applied to the 12 slots 786-1 to 786-12, such that a time difference (e.g., $t_1$, $t_2$, $t_3$, ... $t_{11}$) between two neighboring slots varies. For instance, the time differences between neighboring slots are incrementally increase in accordance with to and $S_{PO}$, where to is a predefined time period and $S_{PO}$ is a predefined phase offset step:

$$t_0 = t_0 + 0S_{PO}$$

$$t_1 = t_0 + 1S_{PO}$$

$$t_2 = t_0 + 2S_{PO}$$

$$t_3 = t_0 + 3S_{PO}$$

$$t_4 = t_0 + 4S_{PO}$$

$$t_5 = t_0 + 5S_{PO}$$

$$t_0 = t_0 + 6S_{PO}$$

$$t_7 = t_1 + 7S_{PO}$$

$$t_8 = t_0 + 8S_{PO}$$

$$t_9 = t_0 + 9S_{PO}$$

$$t_{10} = t_0 + 10S_{PO}$$

$$t_{11} = t_0 + 11S_{PO}$$

In another instance, when $S_{PO}$ is equal to 0, the slots are periodic (e.g., at a lost frequency of 720 Hz), and no phase offset is applied.

In some implementations, realization of the first to the fourth example driving schemes 700a-700d within a frame is not confined to touch sensing or display panels. In some implementation, number of drive signals (e.g., scans) and number of slots within a frame can vary. For instance, as shown in FIG. 7D, the frame waveform 745 of the second example driving schemes 700b includes one slot and 12 drive signals. In another instance, as shown in FIG. 7E, the frame waveform 765 of the third example driving schemes 700c includes two full scans, where each of full scans include 50 drive signals corresponding to 50 transmitters. In some implementations, a phase shift is not limited to one full scan or one frame and can be extended up to 50 milliseconds.

In some implementations, respective phase offsets of respective trains of periodic pulses of the remainder of the plurality of drive signals successively increase or decrease. For instance, as shown in FIG. 7C, respective phase offsets of respective trains of the drive signals 736-1 to 736-3 of the fourth drive group 728-4 are $9S_{PO}$, $10S_{PO}$, and $11S_{PO}$, respectively, which successively increase with respect to the drive signals of the second drive group 728-2.

In some implementations, respective phase offsets of respective train of periodic pulses increase or decrease according to a fixed phase offset step. For instance, as shown in FIG. 7C, respective phase offsets of respective trains of the drive signals 736-1 to 736-3 are $9S_{PO}$, $10S_{PO}$, and $11S_{PO}$, respectively, which increase according to the fixed phase offset step $S_{PO}$. In another instance, as shown in FIG. 7D, respective phase offsets of respective trains of the drive signals 749-1 to 749-12 increase, which can follow a sequential pattern including $0S_{PO}$, $1S_{PO}$, $2S_{PO}$, . . . , and $11S_{PO}$.

In some implementations, respective phase offsets of respective train of periodic pulses increase or decrease according to varied phase offset steps. In other words, respective phase offsets of respective trains of periodic pulses of the remainder of the plurality of drive signals successively increase or decrease, but not necessarily evenly spaced. In one example, respective phase offsets of respective trains of a sequence of three drive signals are $1S_{PO}$, $2S_{PO}$, and $4S_{PO}$. In another example, respective phase offsets of respective trains of a sequence of three drive signals are $1S_{PO}$, $2.25S_{PO}$, and $3S_{PO}$.

In some implementations, respective phase offsets of respective train of periodic pulses are randomly selected from a predefined range of phase offset, such that the respective phase offsets do not successively increase or decrease.

In some implementations, respective phase offsets of respective train of periodic pulses are selected from a predefined range of phase offsets, such that total sums of phase offsets in a first slot to a last slot within a frame are successively increased or decreased according to a fixed phase offset step. For instance, a frame waveform within a frame includes 12 slots, where four slots (e.g., slot S0, slot S1, slot S2, slot S3) synchronize drive groups and each drive group includes three drive signals (e.g., three trains of periodic pulses). Accordingly, phase offsets of a first train to a twelfth train are selected from a phase offset group of $[0S_{PO}, 1S_{PO}, 2S_{PO}, 3S_{PO}, 4S_{PO}, 5S_{PO}, 6S_{PO}, 7S_{PO}, 8S_{PO}, 9S_{PO}, 10S_{PO}, 11S_{PO}]$ as $0S_{PO}$, $1S_{PO}$, $2S_{PO}$, $3S_{PO}$, $4S_{PO}$, $5S_{PO}$, $6S_{PO}$, $7S_{PO}$, $8S_{PO}$, $9S_{PO}$, $10S_{PO}$, $11S_{PO}$, respectively. Total sums of phase offsets $S_{PO}$ in the slots S0, S1, S2, and S3 are:

$$SPO(S0) = 0S_{PO} + 1S_{PO} + 2S_{PO} = 3S_{PO};$$

$$SPO(S1) = 3S_{PO} + 4S_{PO} + 5S_{PO} = 12S_{PO};$$

$$SPO(S2) = 6S_{PO} + 7S_{PO} + 8S_{PO} = 21S_{PO}; \text{ and}$$

$$SPO(S3) = 9S_{PO} + 10S_{PO} + 11S_{PO} = 30S_{PO};$$

where total sums of phase offsets SPO in the slots S0, S1, S2, and S3 are successively increased by $9S_{PO}$.

In some implementations, respective phase offsets of respective train of periodic pulses are selected a predefined range of phase offsets, such that total sums of phase offsets in a first slot to a last slot within a frame are substantially similar. For instance, a frame waveform within a frame includes 12 slots, where four slots (e.g., slot S0, slot S1, slot S2, slot S3) synchronize drive groups and each drive group includes three drive signals (e.g., three trains of periodic pulses). Specifically, phase offsets of a first train to a twelfth train are selected from a phase offset group of $[0S_{PO}, 1S_{PO}, 2S_{PO}, 3S_{PO}, 4S_{PO}, 5S_{PO}, 6S_{PO}, 7S_{PO}, 8S_{PO}, 9S_{PO}, 10S_{PO}, 11S_{PO}]$ as $0S_{PO}, 6S_{PO}, 10S_{PO}, 1S_{PO}, 7S_{PO}, 9S_{PO}, 2S_{PO}, 3S_{PO}, 11S_{PO}, 4S_{PO}, 5S_{PO}, 8S_{PO}$, respectively. As a result, total sums of phase offsets in the slots S0, S1, S2, and S3 are:

$$SPO(S0)=S0:0S_{PO}+6S_{PO}+10S_{PO}=16S_{PO};$$

$$SPO(S1):1S_{PO}+7S_{PO}+9S_{PO}=17S_{PO};$$

$$SPO(S2):2S_{PO}+3S_{PO}+11S_{PO}=16S_{PO};\ and$$

$$SPO(S3):4S_{PO}+5S_{PO}+8S_{PO}=17S_{PO};$$

where the total sums of phase offsets in the slots S0, S1, S2, and S3 are substantially similar with a variation of $1S_{PO}$.

In some implementations, a periodic slot signal has an ON-time period in each slot cycle of the periodic slot signal. A slot frequency of the periodic slot signal is greater than a predefined frame rate of a display panel associated with the touch sensing panel. The ON-time period in each slot cycle varies from zero to a period of the corresponding slot cycle (e.g., a duty cycle of the slot cycle varies from 0% to 100%). For instance, as shown in FIGS. 7A-7B, the first example driving scheme 700*a* adopts a periodic slot signal at a slot frequency about 750 Hz, greater than a predefined frame refresh rate of 60 Hz.

In some implementations, a periodic slot signal has an ON-time period in each slot cycle of the periodic slot signal. A slot frequency of the periodic slot signal is equal to a predefined frame rate of a display panel associated with the touch sensing panel. For instance, as shown in FIG. 7D, the second example driving scheme 700*b* adopts a long slot operating at a slot frequency about 60 Hz, matching the predefined frame refresh rate of 60 Hz.

In some implementations, drive signals are synchronized with slots (e.g., ON-time periods) of a periodic slot signal. For instance, as shown in FIG. 7C, the drive signals 729-1 to 729-3 are synchronized with the fourth slot S3 726-4. In another instance, as shown in FIG. 7F, the drive signals 788-1 to 788-12 are synchronized with the slots 786-1 to 786-12, respectively.

In some implementations, drive signals are grouped into drive groups. Each drive group includes a subset of the drive signals that are enable in a respective slot (e.g., ON-time period) of the periodic slot signal. For instance, as shown in FIGS. 7B, the 12 drive signals are grouped into three drive groups 728-1 to 728-4. Each of the drive groups 728-1 to 728-4 includes a group of three drive signals as a subset of the 12 drive signals that are enabled in the respective slots (e.g., the slots 726-1 to 726-4). In another instance, as shown in FIGS. 7D, the 12 drive signals are grouped into one drive group 748. The drive group 748 includes a group of 12 drive signals as a subset of the 12 drive signals that are enabled in the respective slot (e.g., the slot 746). In yet another instance, as shown in FIGS. 7F, the 12 drive signals are grouped into 12 drive groups 788-1 to 788-12. Each of the drive groups 788-1 to 788-12 includes a group of one drive signal a subset of the 12 drive signals that are enabled in the respective slots (e.g., the slots 786-1 to 786-12).

In some implementations, respective drive groups of drive signals are synchronized. For instance, as shown in FIG. 7B, the drive groups of 728-1 to 728-4 are synchronized. In another instance, as shown in FIG. 7F, the drive groups of 788-1 to 788-12 are synchronized.

In some implementations, each drive group of a frame waveform includes the same number of drive signals. For instance, in reference to the first example driving scheme 700*a*, each drive group of 708-1 to 708-4 or 728-1 to 728-1 include three drive signals. In another instance, in reference to the fourth example driving scheme 700*d*, each drive group of 788-1 to 788-12 includes one drive signal.

In some implementations, drive groups of a frame waveform include different number of drive signals. For instance, respective drive groups of a series of three drive groups include three drive signals, two drive signals, and one drive signal, respectively. In another instance, respective drive groups of a series of four drive groups include one drive signal, two drive signals, three drive signals, and four drive signals, respectively.

In some implementations, drive groups of a frame waveform include a first drive group and a second drive group. The first drive group includes a first subset of drive signals, and the second drive group includes a second subset of drive signals. For each of the second subset of drive signals, a respective phase offset of a train of periodic pulses is greater than respective phase offsets of the first subset of drive signals. For instance, as shown in FIG. 7C, for each of the drive signals 729-1 to 729-3 of the drive group 728-4, the respective phase offset of the train of periodic pulses is greater than the respective phase offsets of the drive signals of the drive group 728-2.

In some implementations, for each of the second subset of drive signals, a respective phase offset of a train of periodic pulses is smaller than respective phase offsets of the first subset of drive signals. In some implementations, for each of the second subset of drive signals, a respective phase offset of a train of periodic pulses is equal to respective phase offsets of the first subset of drive signals, resulting in a driving scheme without phase shifts.

In some implementations, for each of a remainder of drive signals, a respective phase offset of a respective train of periodic pulses is determined based on at least one of a requirement for reduction in an emission level of electromagnetic interference and a requirement for reduction in a noise level.

Controlling Flat-Peak Sinusoidal Waveforms for EMI Harmonic Amplitude Reduction

In some implementations, sinusoidal waveform is used to eliminate transmitting ($T_x$) harmonics. However, implementation of sinusoidal waveforms would be limited by speed of a panel. Specifically, panel sensors cannot be fully charged when a $T_x$ sinusoidal waveform reaches its maximum amplitude because RC characteristics of the panel delays its charging process. As a result, measured touch sensing response to a user's finger would be reduced, leading to a reduced signal-to-noise ratio (SNR).

By implementing flat-peak sinusoidal waveforms, additional charging time at peak of a flat-peak sinusoidal waveform can be realized, which allows to extend charging process of panel sensors for improving the SNR. Sinusoidal portion of a rising edge of the flat-peak sinusoidal waveform can be used as a transition. The waveform is paused at its maximum peak for an amount of time (e.g., 50% of a half period, or 25% of a period) to allow for panel settling. Similarly, sinusoidal portion of a falling edge of the flat-peak sinusoidal waveform can be used as another transition, e.g., the waveform is held at its minimum peak for the same amount of time. Thus, compared to scans based on trapezoidal waveforms, implementation of flat-peak sinusoidal waveforms would result in a substantial reduction in $T_x$ harmonics.

This approach allows to control panel charging speed. Faster charging speed (e.g., larger charging current) leads to an increase in EMI emissions are generated by the higher charging speed (bigger charging current). For instance, the trapezoidal waveform maintains a nearly constant charging speed from a start of a rising edge or a falling edge. The charging then slows towards the end of transition (e.g., due to a resistance-capacitance (RC) constant of the panel). On the other hand, the flat-peak sinusoidal waveform allows for a slow increase in charging speed, reaching a maximum peak at a midpoint of the transition. The charging then slows down to zero at the end of transition. As a result, there is only a short period with a maximum charging speed only at a midpoint of the transition, resulting in a smaller average charging speed. The smaller average charging speed leads to a decrease in EMI emissions. In conventional square waveforms or trapezoidal waveforms, higher frequency components emerge during rapid slew rate changes. Implementing sinusoidal rising and falling pattern can minimize the slew rate changes at beginning and end of the rising or falling edges. Furthermore, a flat peak allows charge to settle across the panel back into a receiver.

Figure 8:
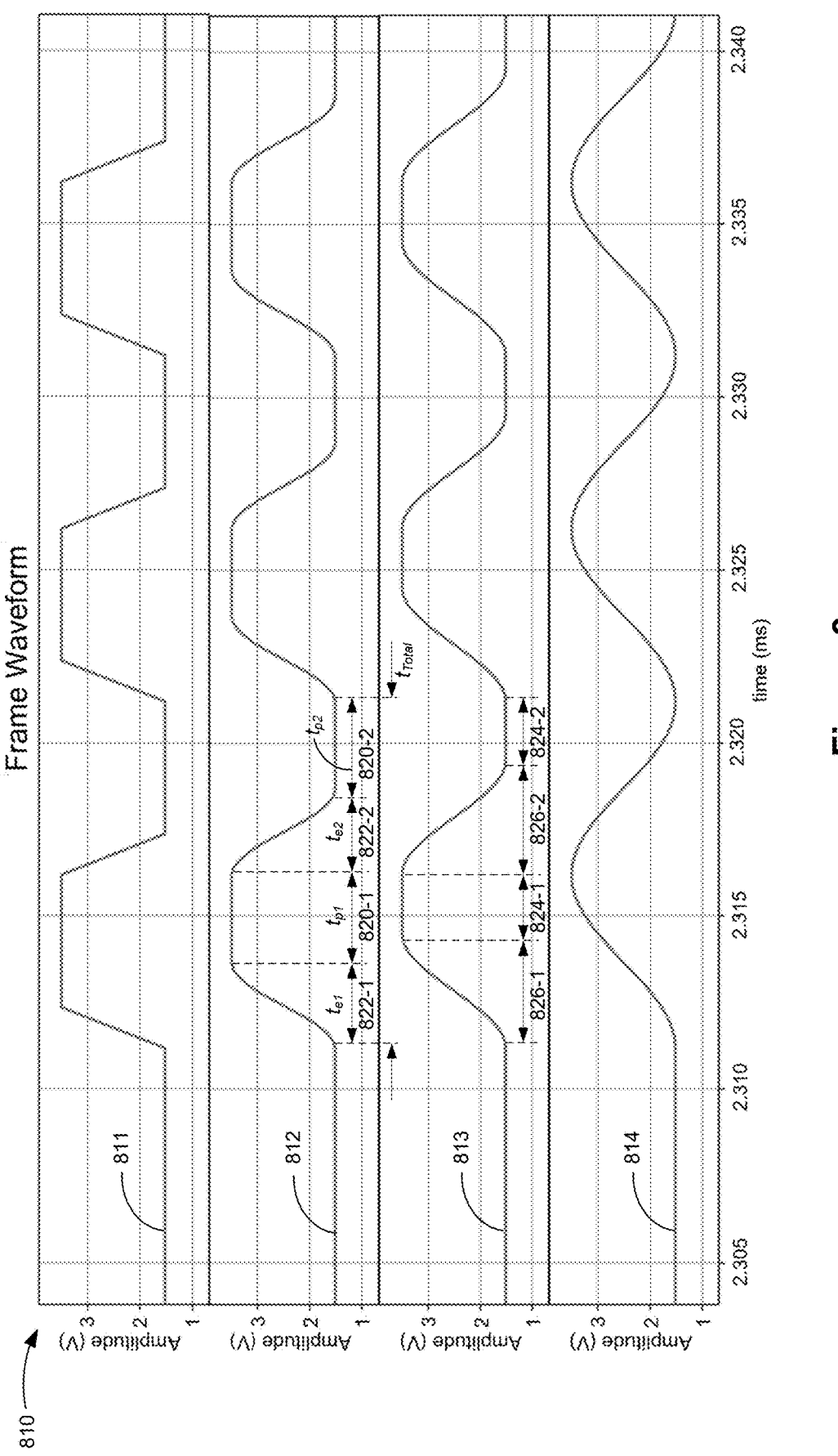
FIG. 8 illustrates example flat-peak sinusoidal waveforms, in accordance with some implementations.

FIG. 8 illustrates example flat-peak sinusoidal waveforms 800, in accordance with some implementations. Example trapezoidal waveform 811 is used as a reference. First to third example flat-peak sinusoidal waveforms 812 and 814 have different flat-top-sine ratios. An x axis of the frame waveform plot 810 represents time in unit of millisecond (ms) ranging from about 2.305 ms to about 2.340 ms, and an y axis of the frame waveform plot 810 represents voltage in unit of volt ranging from about 1 V to about 4 V. A flat-top-sine ratio is the ratio between a time duration of peak portions (e.g., flat portions) and a period time of the flat-peak sinusoidal waveform (e.g., the train of periodic pulses). When the flat-top-sine ratio is equal to 0%, the flat-peak sinusoidal waveform becomes the sinusoidal waveform (e.g., the third example flat-peak sinusoidal waveform 814). Moreover, the flat-top-sine ratios of the first and the second flat-peak sinusoidal waveforms 812 and 813 are 50% and 33%, respectively, falling within a range of 0% to 100%.

As illustrated in the frame waveform plot 810, each flat-peak sinusoidal waveform (e.g., 812 or 813) includes at least one peak portion and two edge portions. The one peak portion includes at least a first peak portion (e.g., 820-1 or 824-1) and a second peak portion (e.g., 820-2 or 824-2), where the first peak portion (e.g., 820-1 or 824-1) is saturated at a predefined high voltage level and the second peak portion (e.g., 820-2 or 824-2) is saturated at a predefined low voltage level. Moreover, the two edge portions match a full sinusoidal waveform corresponding to the flat-peak sinusoidal waveform (e.g., 812 or 813), and the two edge portions include a rising edge portion (e.g., 822-1 or 826-1) and a falling edge portion (e.g., 822-2 or 826-2).

In some embodiments, each flat-peak sinusoidal waveform (e.g., 812 or 813) has a respective amplitude of harmonic peaks. The respective amplitude of harmonic peaks decreases as a duty cycle of the first peak portion (e.g., 820-1 or 824-1) in the respective flat-peak sinusoidal waveform decreases.

In some implementations, for each drive signal, respective train of periodic pulses includes a flat-peak sinusoidal waveform in each periodic cycle. The flat-peak sinusoidal waveform further includes at least one peak portion and two edge portions. The one peak portion includes at least one of a first peak portion and a second peak portion, where the first peak portion is saturated at a predefined high voltage level and the second peak portion is saturated at a predefined low voltage level. The two edge portions match a full sinusoidal waveform corresponding to the flat-peak sinusoidal waveform and include a rising edge portion and a falling edge portion.

In some implementations, a rising edge portion of a flat-peak sinusoidal waveform is determined by a predefined charging speed of a distinct one of touch sensing region, and a falling edge portion of a flat-peak sinusoidal waveform is determined by a predefined discharging speed of a distinct one of touch sensing regions. At least one of a first peak portion and/or a second peak portion of a flat-peak sinusoidal waveform is determined by a predefined settling time of a distinct one of touch sensing regions.

In some implementations, a flat-top-sine ratio is a ratio between a time duration of at least one peak portion and a period time of the train of periodic pulses. The flat-top-sine ratio varies between a predefined range of portions. For instance, as shown in FIG. 8, the flat-top-sine-ratio of the first example flat-peak sinusoidal waveform 812 is equal to $(t_{p1}+t_{p2})/t_{Total}$, where $t_{Total}$ is a sum of $t_{p1}$, $t_{p2}$, $t_{e1}$, and $t_{e2}$. In another instance, a flat-peak sine waveform changes to a sinusoidal wave in accordance with a change in the flat-top-sine ratio to 0% (e.g., from the second to the third example flat-peak sinusoidal waveforms 813 to 814 in reference to FIG. 8).

In some implementations, two edge portions of a flat-peak sinusoidal waveform includes a rising edge portion that has a rise time and a falling edge portion that has a fall time equal to the rise time. Conversely, in some implementations, the fall time is not equal to the rise time, which provides a flexibility in modulating waveforms of drive signals.

In some implementations, a time duration of a first peak portion of a flat-peak sinusoidal waveform (e.g., $t_{p1}$ in reference to FIG. 8) is determined by at least one of a transmitting frequency of the flat-peak sinusoidal waveform (e.g., a frequency of a respective train of periodic pulses) or a requirement for reduction in an emission level of EMI.

In some implementations, for each drive signal that corresponds to a distinct one of touch sensing regions, a full sinusoidal waveform that corresponds to a flat-peak sinusoidal waveform has a waveform amplitude and the flat-peak sinusoidal waveform has a flat-peak amplitude. The waveform amplitude of the full sinusoidal waveform is determined based on a predefined charging speed of the distinct one of touch sensing regions. The flat-peak amplitude of the full sinusoidal waveform is determined by based on requirements for an emission level of EMI and a signal-to-noise ratio (SNR).

In some implementations, EMI measurement is performed to inspect EMI emission levels at various harmonic frequencies resulting from an implementation of flat-peak sinusoidal waveforms. Data from the EMI measurement indicate that levels of emission can be controlled by adjusting the flat-top-sine ratio of the flat-peak sinusoidal waveform. Further, implementing flat-peak sinusoidal waveforms offers advantages of leveraging (i) slower increase in charging speed associated with sinusoidal waveforms and (ii) longer settling time for charge associated with trapezoidal waveforms.

FIG. 9 is a flow diagram of an example method 900 of sensing touch events on a touch sensing panel, in accordance with some implementations. The method 900 is implemented at an electronic device that includes, or is coupled to, a touch sensing panel. The electronic device identifies (902) a plurality of touch sensing regions of the touch sensing panel. The touch sensing panel includes (904) a capacitive sensor array. The electronic device generates (906) a plurality of drive signals for the plurality of touch sensing regions. Each drive signal corresponds (908) to a distinct one of the plurality of touch sensing regions and includes a respective train of periodic pulses. For each drive signal, the respective train of periodic pulses has (910) a respective phase offset with respect to a reference (e.g., a train of periodic pulses of one of the plurality of drive signals, a fixed reference time $t_R$). While applying the plurality of drive signals on the plurality of touch sensing regions, the electronic device measures (912) a plurality of capacitance sensing signals from the plurality of touch sensing regions. The electronic device detects (914) one or more touch events on the capacitive sensor array based on the plurality of capacitance sensing signals.

In some implementations, for each of the plurality of drive signals, the phase offset of the respective train of periodic signals is less than or equal to a half of a period of the respective train of periodic pulses. Conversely, in some embodiments, for at least one of the plurality of drive signals, the phase offset of the respective train of periodic signals is greater than a half of a period of the respective train of periodic pulses.

In some implementations, for each of the plurality of drive signals, the electronic device selects the respective phase offset of the respective train of periodic pulses from a plurality of predefined phase offset values. The plurality of predefined offset values includes k distinct phase offset values, k being an integer greater than one. Further, in some implementations, the plurality of predefined phase offset values includes an ordered sequence of phase offset values that are evenly spaced according to a phase offset step $S_{PO}$. Additionally, in some implementations, the plurality of predefined phase offset values is equal to $1S_{PO}$, $2S_{PO}$, $3S_{PO}$, . . . , or $(k-1)S_{PO}$.

In some implementations, respective phase offsets of respective trains of periodic pulses of the plurality of drive signals successively increase or decrease. Further, in some implementations, the respective phase offsets of the respective train of periodic pulses increase or decrease according to a fixed phase offset step. Conversely, in some implementations, the respective phase offsets of the respective train of periodic pulses increase or decrease according to a variable phase offset step.

In some implementations, the electronic device obtains a periodic slot signal that has an ON-time period in each slot cycle of the periodic slot signal. A slot frequency of the periodic slot signal is greater than a predefined frame rate of a display panel associated with the touch sensing panel. The electronic device synchronizes the plurality of drive signals with the ON-time period of the periodic slot signal. Further, in some implementations, the plurality of drive signals is grouped into a plurality of drive groups. Each of the plurality of drive group includes a subset of the plurality of drive signals that are enabled in a respective ON-time period of the periodic slot signal. Additionally, in some implementations, the plurality of drive groups of the plurality of drive signals is synchronized. In some implementations, each drive group includes a same number of drive signals. In some implementations, the plurality of drive groups includes a first drive group and a second drive group. The first drive group includes a first subset of drive signals, and the second drive group includes a second subset of drive signals. For each of the second subset of drive signals, the respective phase offset of the respective train of periodic pulses is greater than the respective phase offsets of the first subset of drive signals. In some implementations, the plurality of drive groups includes a first drive group and a second drive group. The first drive group includes a first number of drive signals, and the second drive group includes a second number of drive signals. The first number is distinct and different from the second number.

In some implementations, for each of the plurality of drive signals, the electronic device determines the respective phase offset of the respective train of periodic pulses based on at least one of a requirement for reduction in an emission level of electromagnetic interference and a requirement for reduction in a noise level.

In some implementations, for each drive signal, the respective train of periodic pulses includes a flat-peak sinusoidal waveform in each periodic cycle. The flat-peak sinusoidal waveform further includes at least one peak portion and two edge portions. The at least one peak portion includes at least one of a first peak portion and a second peak portion. The first peak portion is saturated at a predefined high voltage level, and the second peak portion is saturated at a predefined low voltage level. The two edge portions match a full sinusoidal waveform corresponding to the flat-peak sinusoidal waveform, and the two edge portions include a rising edge portion and a falling edge portion. Further, in some implementations, the rising edge portion is determined by a predefined charging speed of the distinct one of the plurality of touch sensing regions. The falling edge portion is determined by a predefined discharging speed of the distinct one of the plurality of touch sensing regions. The at least one of the first peak portion and the second peak portion is determined by a predefined settling time of the distinct one of the plurality of touch sensing regions. Additionally, in some implementations, a ratio between a time duration of the at least one peak portion and a period time of the train of periodic pulses varies between a predefined range of portions.

In some implementations, the two edge portions include a rising edge portion having a rise time and a falling edge portion having a fall time equal to the rise time. Further, in some implementations, a time duration of the first peak portion is determined by at least one of a respective frequency of the flat-peak sinusoidal waveform or a requirement for reduction in an emission level of electromagnetic interference.

In some implementations, for each drive signal corresponding to the distinct one of the plurality of touch sensing regions, the full sinusoidal waveform corresponding to the flat-peak sinusoidal waveform has a waveform amplitude, and the flat-peak sinusoidal waveform has a flat-peak amplitude. The electronic device determines the waveform amplitude based on a predefined charging speed of the distinct one of the plurality of touch sensing regions. The electronic device determines the flat-peak amplitude based on requirements for an emission level of electromagnetic interference and a signal-to-noise ratio (SNR).

It should be understood that the particular order in which the operations in FIG. 9 have been described are merely exemplary and are not intended to indicate that the described order is the only order in which the operations could be performed. One of ordinary skill in the art would recognize various ways to providing an electronic device for controlling phase shifts and flat-peak sinusoidal waveforms for EMI harmonic amplitude reduction as described herein. It is also noted that more details on the method of controlling phase shifts and flat-peak sinusoidal waveforms for EMI harmonic amplitude reduction are explained above with reference to FIGS. 1-9. For brevity, these details are not repeated in the description herein.

It will also be understood that, although the terms first, second, etc. are, in some instances, used herein to describe various elements, these elements should not be limited by these terms. These terms are only used to distinguish one element from another. For example, a first electronic device can be termed a second electronic device, and, similarly, a second electronic device can be termed a first electronic device, without departing from the scope of the various described implementations. The first electronic device and the second electronic device are both electronic device, but they are not the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of sensing touch events on a touch sensing panel, comprising:

identifying a plurality of touch sensing regions of the touch sensing panel, the touch sensing panel including a capacitive sensor array;

generating a plurality of drive signals for the plurality of touch sensing regions, each drive signal corresponding to a distinct one of the plurality of touch sensing regions and including a respective train of periodic pulses, wherein for each drive signal, the respective train of periodic pulses has a respective phase offset with respect to a reference;

obtaining a periodic slot signal that has an ON-time period in each slot cycle of the periodic slot signal, wherein a slot frequency of the periodic slot signal is greater than a predefined frame rate of a display panel associated with the touch sensing panel;

synchronizing the plurality of drive signals with the ON-time period of the periodic slot signal;

while applying the plurality of drive signals on the plurality of touch sensing regions, measuring a plurality of capacitance sensing signals from the plurality of touch sensing regions; and detecting one or more touch events on the capacitive sensor array based on the plurality of capacitance sensing signals.

2. The method of claim 1, wherein for each of the plurality of drive signals, the phase offset of the respective train of periodic signals is less than or equal to a half of a period of the respective train of periodic pulses.

3. The method of claim 1, further comprising, for each of the plurality of drive signals:

selecting the respective phase offset of the respective train of periodic pulses from a plurality of predefined phase offset values, the plurality of predefined offset values including k distinct phase offset values, k being an integer greater than one.

4. The method of claim 3, wherein:

the plurality of predefined phase offset values includes an ordered sequence of phase offset values that are evenly spaced according to a phase offset step $S_{PO}$, such that each respective phase offset step $S_{PO}$ represents a phase step in a unit of time.

5. The method of claim 4, wherein the plurality of predefined phase offset values is equal to $1S_{PO}$, $2S_{PO}$, $3S_{PO}$, . . . , or $(k–1)S_{PO}$.

6. The method of claim 1, wherein respective phase offsets of respective trains of periodic pulses of the plurality of drive signals successively increase or decrease.

7. The method of claim 6, wherein the respective phase offsets of the respective train of periodic pulses increase or decrease according to a fixed phase offset step.

8. The method of claim 1, wherein:

the plurality of drive signals is grouped into a plurality of drive groups; and each of the plurality of drive group includes a subset of the plurality of drive signals that are enabled in a respective ON-time period of the periodic slot signal.

9. The method of claim 8, wherein the plurality of drive groups of the plurality of drive signals is synchronized.

10. The method of claim 8, wherein each drive group includes a same number of drive signals.

11. The method of claim 8, wherein:

the plurality of drive groups includes a first drive group and a second drive group;

the first drive group includes a first subset of drive signals, and the second drive group includes a second subset of drive signals; and for each of the second subset of drive signals, the respective phase offset of the respective train of periodic pulses is greater than the respective phase offsets of the first subset of drive signals.

12. The method of claim 1, further comprising:

for each of the plurality of drive signals, determining the respective phase offset of the respective train of periodic pulses based on at least one of a requirement for reduction in an emission level of electromagnetic interference and a requirement for reduction in a noise level.

13. The method of claim 1, wherein for each drive signal, the respective train of periodic pulses includes a flat-peak sinusoidal waveform in each periodic cycle, the flat-peak sinusoidal waveform further comprising:

at least one peak portion that includes at least one of a first peak portion and a second peak portion, the first peak portion being saturated at a predefined high voltage level and the second peak portion being saturated at a predefined low voltage level; and two edge portions that match a full sinusoidal waveform corresponding to the flat-peak sinusoidal waveform, the two edge portions including a rising edge portion and a falling edge portion.

14. The method of claim 13, wherein:

the rising edge portion is determined by a predefined charging speed of the distinct one of the plurality of touch sensing regions;

the falling edge portion is determined by a predefined discharging speed of the distinct one of the plurality of touch sensing regions; and the at least one of the first peak portion and the second peak portion is determined by a predefined settling time of the distinct one of the plurality of touch sensing regions.

15. The method of claim 14, wherein a ratio between a time duration of the at least one peak portion and a period time of the train of periodic pulses varies between a predefined range of portions.

16. The method of claim 13, wherein the two edge portions include a rising edge portion having a rise time and a falling edge portion having a fall time equal to the rise time.

17. The method of claim 16, wherein a time duration of the first peak portion is determined by at least one of a respective frequency of the flat-peak sinusoidal waveform or a requirement for reduction in an emission level of electromagnetic interference.

18. The method of claim 13, wherein for each drive signal corresponding to the distinct one of the plurality of touch sensing regions, the full sinusoidal waveform corresponding to the flat-peak sinusoidal waveform has a waveform amplitude, and the flat-peak sinusoidal waveform has a flat-peak amplitude, the method further comprising:

determining the waveform amplitude based on a predefined charging speed of the distinct one of the plurality of touch sensing regions; and determining the flat-peak amplitude based on requirements for an emission level of electromagnetic interference and a signal-to-noise ratio (SNR).

19. An electronic device, comprising:

a touch sensing panel including a capacitive sensor array and partitioned to a plurality of touch sensing regions; and a processing device coupled to the capacitive sensor array, further including a processing core, a memory coupled to the processing core, and a capacitive sense circuit coupled to the processing core;

wherein the memory stores one or more programs configured for execution by the processing core to control the capacitive sense circuit to:

identify a plurality of touch sensing regions of the touch sensing panel, the touch sensing panel including a capacitive sensor array;

generate a plurality of drive signals for the plurality of touch sensing regions, each drive signal corresponding to a distinct one of the plurality of touch sensing regions and including a respective train of periodic pulses that has a respective phase offset, wherein for each drive signal, the respective train of periodic pulses has a respective phase offset with respect to a reference;

obtain a periodic slot signal that has an ON-time period in each slot cycle of the periodic slot signal, wherein a slot frequency of the periodic slot signal is greater than a predefined frame rate of a display panel associated with the touch sensing panel; and synchronize the plurality of drive signals with the ON-time period of the periodic slot signal while applying the plurality of drive signals on the plurality of touch sensing regions, measure a plurality of capacitance sensing signals from the plurality of touch sensing regions; and detect one or more touch events on the capacitive sensor array based on the plurality of capacitance sensing signals.

20. A method of sensing touch events on a touch sensing panel, comprising:

identifying a plurality of touch sensing regions of the touch sensing panel, the touch sensing panel including a capacitive sensor array;

generating a plurality of drive signals for the plurality of touch sensing regions, each drive signal corresponding to a distinct one of the plurality of touch sensing regions and including a respective train of periodic pulses, wherein for each drive signal:

the respective train of periodic pulses has a respective phase offset with respect to a reference; and selecting the respective phase offset of the respective train of periodic pulses from a plurality of predefined phase offset values, the plurality of predefined offset values including: (i) k distinct phase offset values, k being an integer greater than one and (ii) an ordered sequence of phase offset values that are evenly spaced according to a phase offset step $S_{PO}$, such that each respective phase offset step $S_{PO}$ represents a phase step in a unit of time and the plurality of predefined phase offset values is equal to $1S_{PO}$, $2S_{PO}$, $3S_{PO}$, . . . , or $(k-1)S_{PO}$;

while applying the plurality of drive signals on the plurality of touch sensing regions, measuring a plurality of capacitance sensing signals from the plurality of touch sensing regions; and detecting one or more touch events on the capacitive sensor array based on the plurality of capacitance sensing signals.

* * * * *